(12) United States Patent
Le

(10) Patent No.: US 7,139,367 B1
(45) Date of Patent: Nov. 21, 2006

(54) TIME SHARE DIGITAL INTEGRATION METHOD AND APPARATUS FOR PROCESSING X-RAY IMAGES

(76) Inventor: Khai Minh Le, 5071 Audrey Dr., Huntington Beach, CA (US) 92649

( * ) Notice: Subject to any disclaimer, the term of this patent is extended or adjusted under 35 U.S.C. 154(b) by 34 days.

(21) Appl. No.: 10/953,285

(22) Filed: Sep. 29, 2004

(51) Int. Cl.
*H05G 1/64* (2006.01)

(52) U.S. Cl. .......................... 378/98; 378/116

(58) Field of Classification Search ............... 378/19, 378/98, 114, 115, 116
See application file for complete search history.

(56) References Cited

U.S. PATENT DOCUMENTS

| | | | | |
|---|---|---|---|---|
| 4,021,667 A | * | 5/1977 | Clausen et al. | 378/45 |
| 4,392,236 A | * | 7/1983 | Sandstrom et al. | 378/45 |
| 5,421,330 A | * | 6/1995 | Thirion et al. | 378/901 |
| 5,568,530 A | * | 10/1996 | Saito et al. | 378/4 |
| 5,943,388 A | * | 8/1999 | Tumer | 378/98.9 |
| 6,256,366 B1 | * | 7/2001 | Lai | 378/4 |

* cited by examiner

*Primary Examiner*—Edward J. Glick
*Assistant Examiner*—Chih-Cheng Glen Kao
(74) *Attorney, Agent, or Firm*—William L. Chapin

(57) ABSTRACT

A method and apparatus for processing signals output from an array of X-ray radiation detectors which receive X-ray radiation emanating from an object irradiated by a source beam of X-ray radiation, to thereby produce an visual image of internal object features, utilizes repetitive sampling P times and digital accumulation of signals output from each detector to increase signal-to-noise ratio of the images by the factor $1/\sqrt{P}$. In a basic embodiment, each of the N detectors in a linear detector array is sampled P times. In another embodiment, artifacts resulting from decay of detector pre-amplifier output voltages on capacitors of low-pass filter circuits, referred to as pseudo-integrators, are reduced by sequentially sampling and accumulating each of N detector amplifier output voltages P times in turn, and repeating the sampling and accumulating sequence Q times, thereby reducing variations in the P×Q accumulated values between the first and last detector channels of an N detector array.

42 Claims, 17 Drawing Sheets

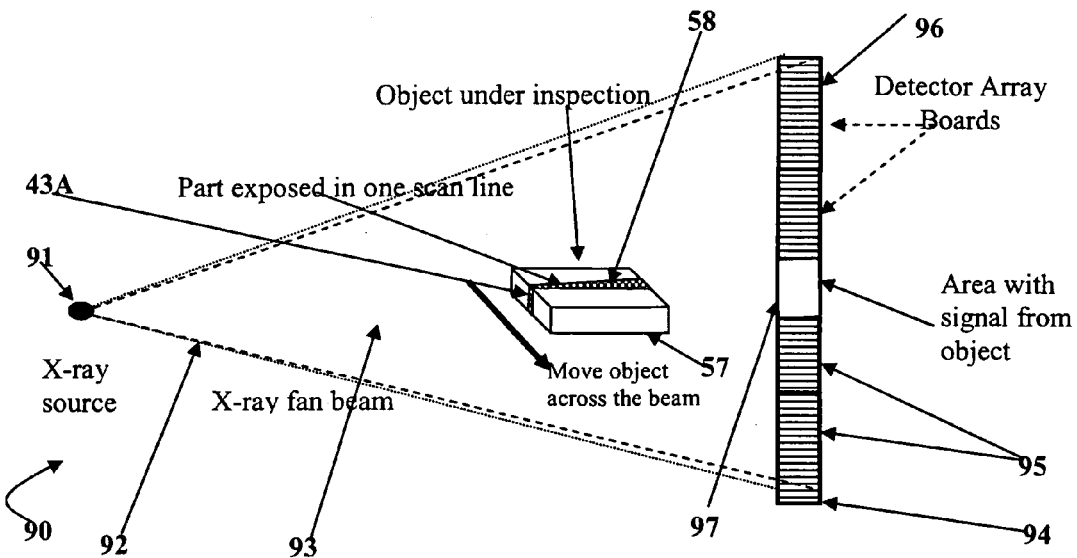
Figure 7
Figure 3A (Prior Art)
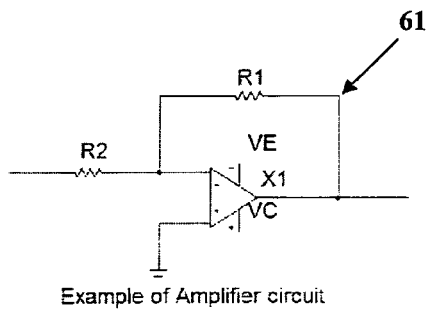
Example of Amplifier circuit
Figure 3B (Prior Art)
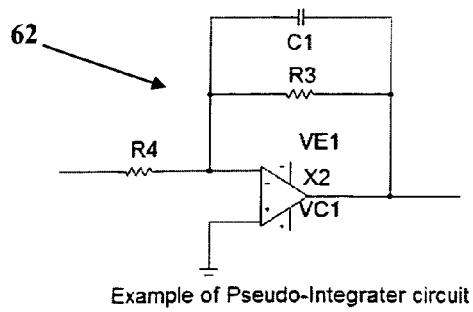
Example of Pseudo-Integrater circuit

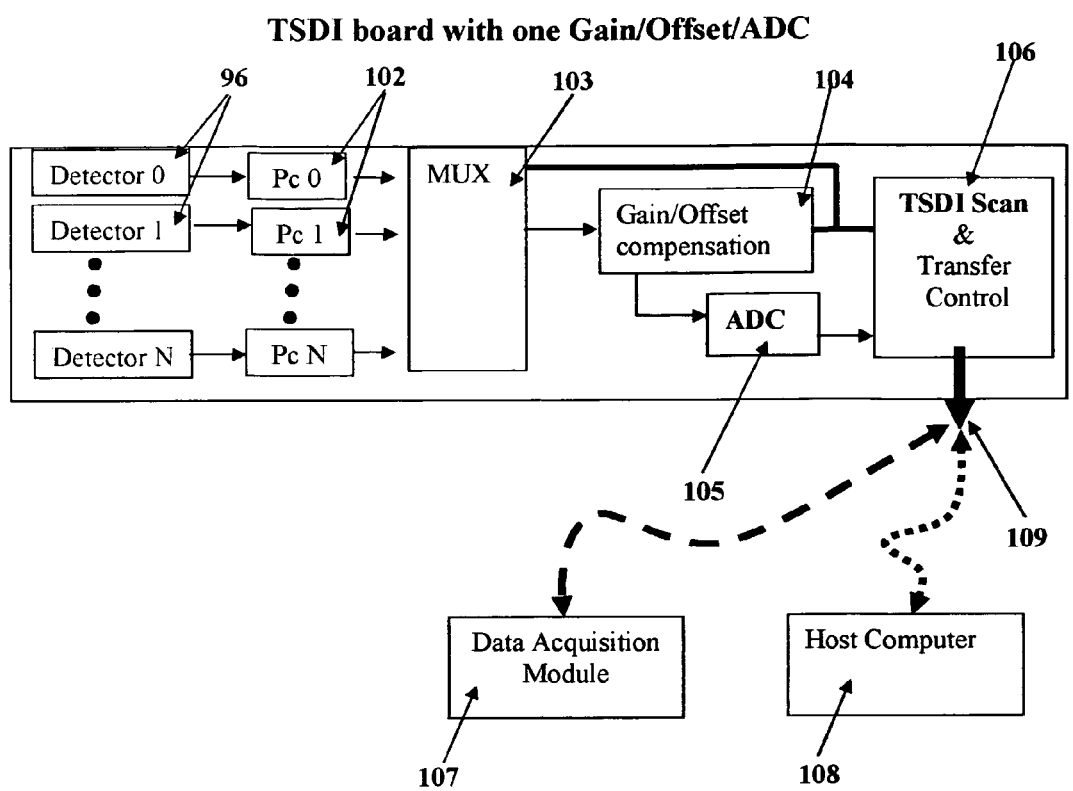
Figure 9A
The following lines are alternative connection
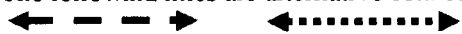
PC : Pre-Condition circuit

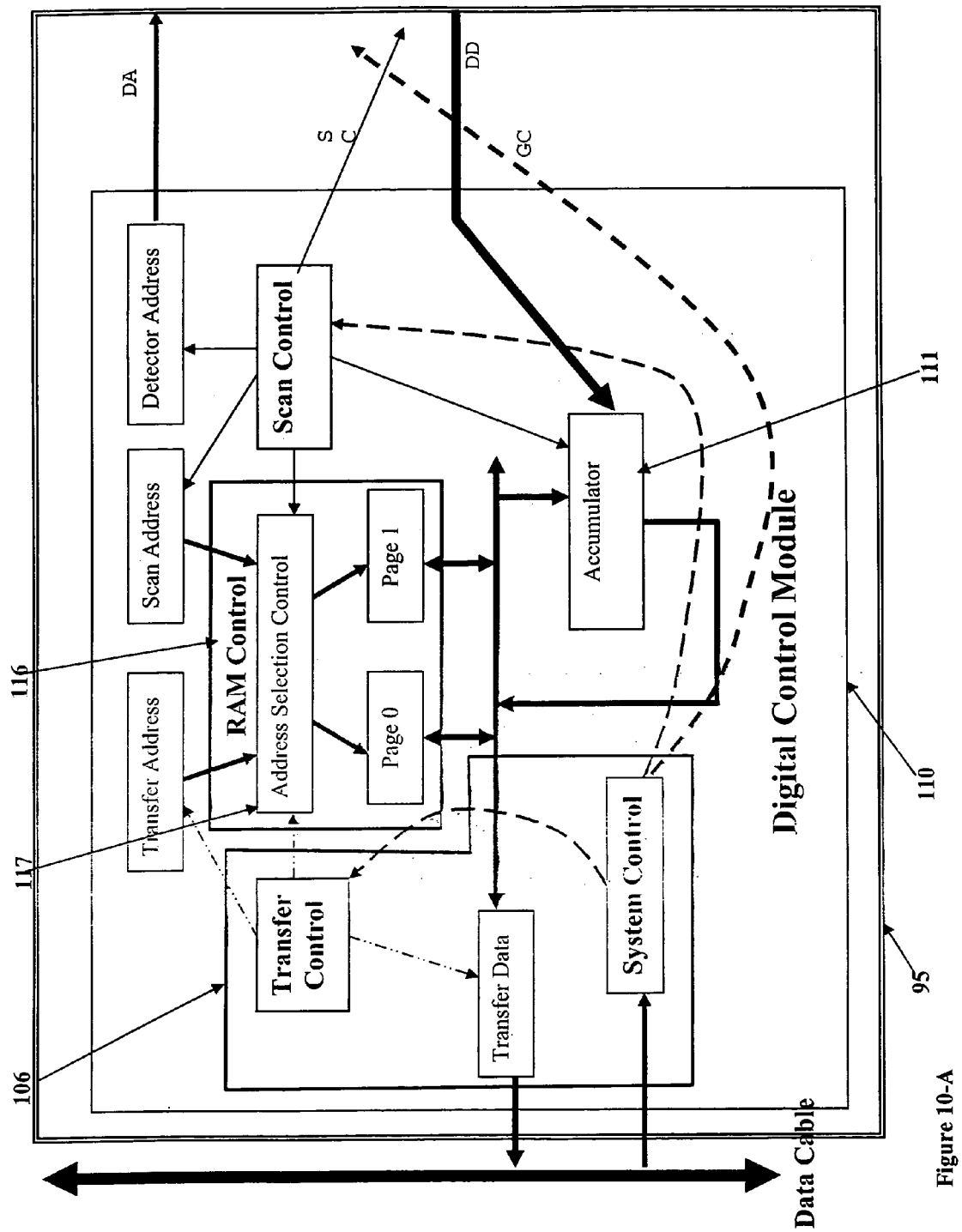
Figure 10-A

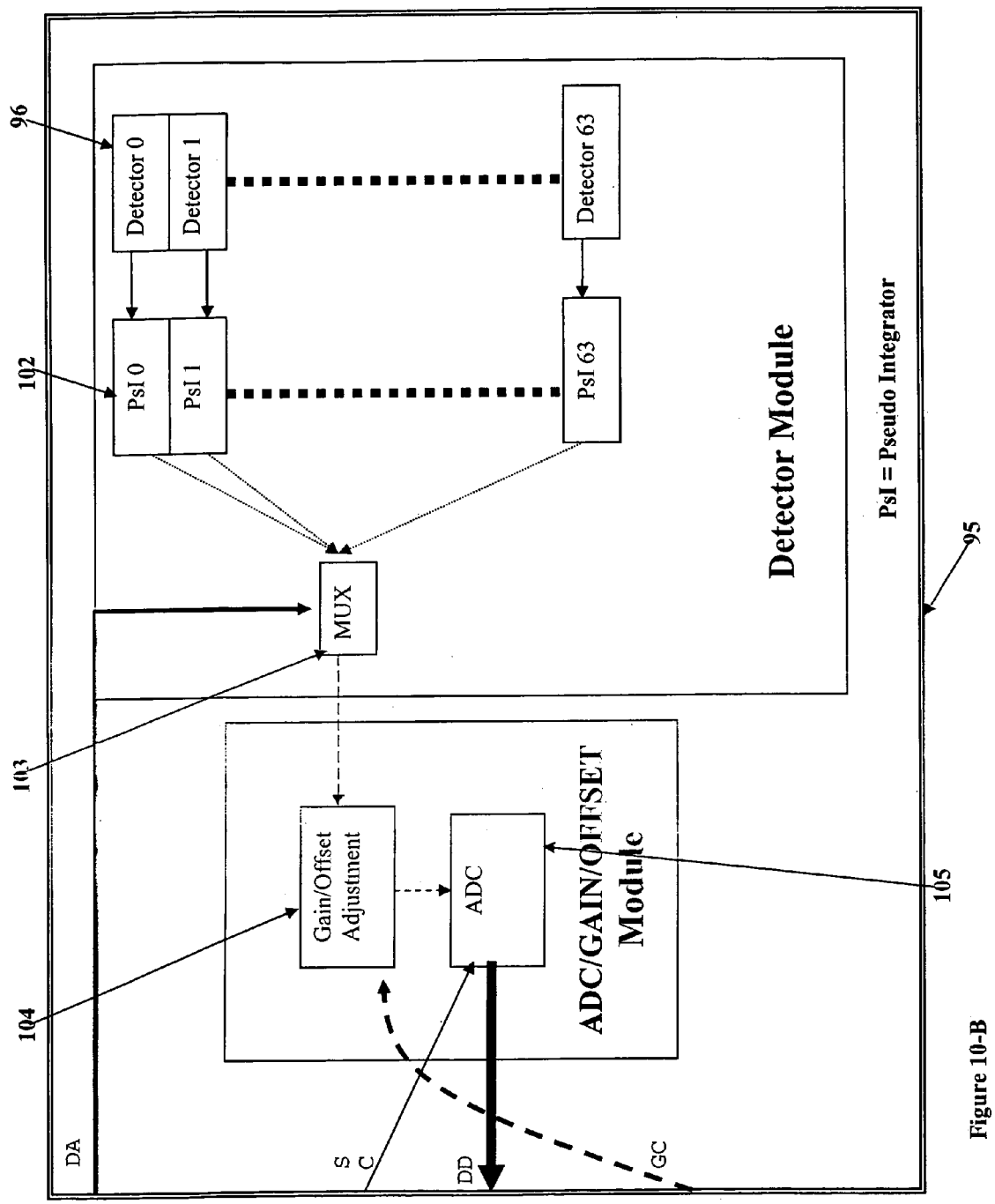
Figure 10-B

Example of Sample-Until-Done of system with 2 DABs, each has 4 detectors
Straight Split
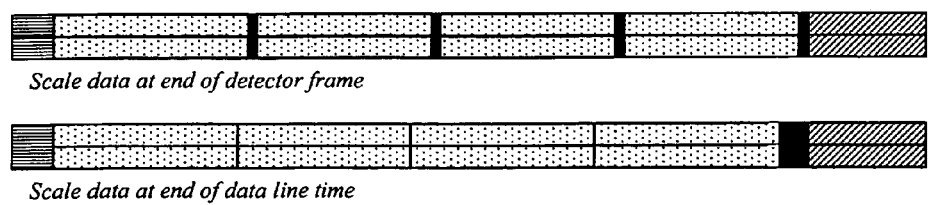
*Scale data at end of detector frame*
*Scale data at end of data line time*
Staggered Split
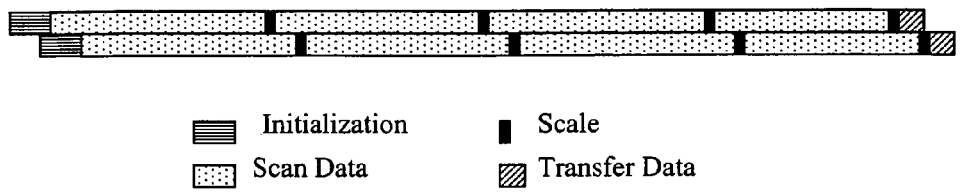
▤ Initialization    ▪ Scale
▦ Scan Data    ▨ Transfer Data
Figure 11

Artifact caused by "Sample until Done" in Pseudo-Integrator Detector

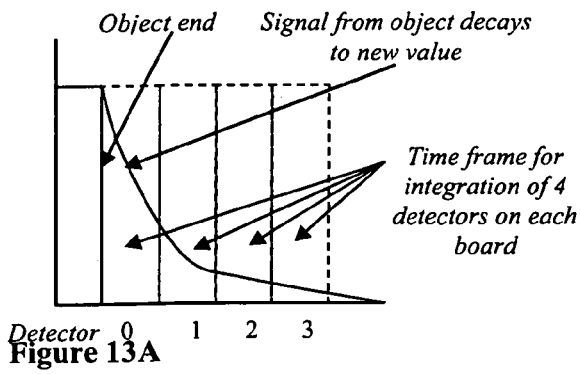

Figure 13A

At the edge of an object, due to time constant of the Pseudo-Integrator, signal intensity slowly change to new value. During this time, the scan engine samples 4 batches for 4 detectors

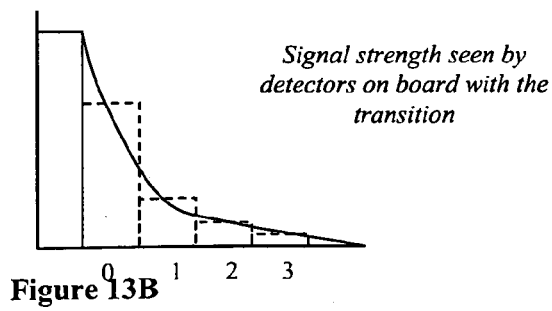

Figure 13B

All detector board samples and integrates data in same step. If we use "Sample until Done", each succeeding detector will get a big different reading because it collected data at the different part of the transition curve.

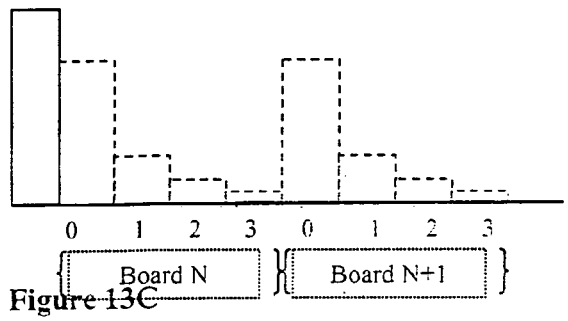

Figure 13C

Since consecutive detector boards are concatenated end to end to make long line of detector, if the transition covers two or more boards, the signal intensity seen by these board will exhibit a saw-tooth pattern.

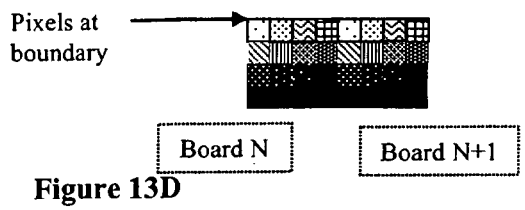

Figure 13D

In term of image, one would see something similar to that on the left.

Figure 13

Example of Multi-Scan with 2 DABs, each has 4 detectors. The scan sequence is repeated 3 times in the period for one line

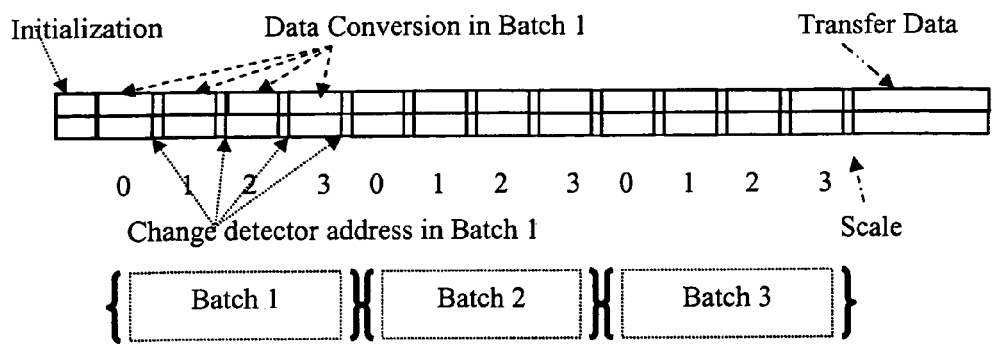

Figure 14

Artifact caused by "Multi-Scan" in Pseudo-Integrator Detector

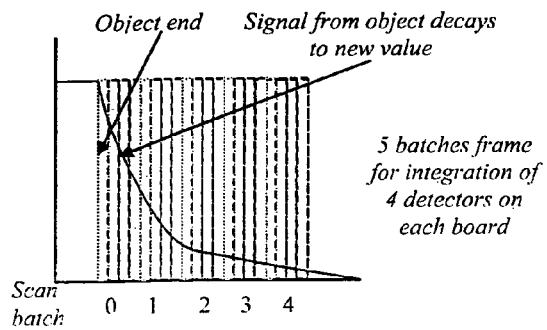

Figure 15A

At the edge of an object, due to time constant of the Pseudo-Integrator, signal intensity slowly change to new value. During this time, the scan engine samples 5 batches. Each batch contains data for each detector. Each detector thus captures the signal 5 times, each at latter part of the signal.

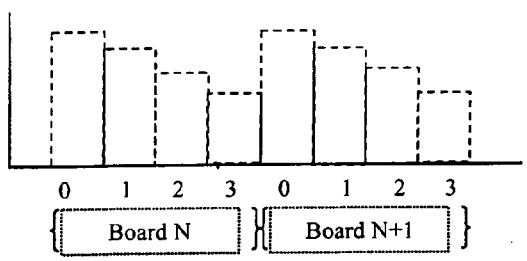

Figure 15B

Since each detector captures data at all phases of the decay of the input signal, the difference between the one with highest signal and the one with lowest signal is reduced. Intensity profile of two consecutive detector board would be similar to the diagram on the left.

Figure 15

TIME SHARE DIGITAL INTEGRATION METHOD AND APPARATUS FOR PROCESSING X-RAY IMAGES

BACKGROUND OF THE INVENTION

A. Field of the Invention

The present invention relates to methods and apparatus which employ X-ray or gamma ray radiography to obtain images of internal features of a human body, or objects within luggage or other such containers. More particularly, the invention relates to improved signal processing methods and apparatus for converting signals output from an array of X-ray radiation detectors which receive X-radiation emanating from an object irradiated by a source beam of X-ray radiation, to visually discernible images of internal features of the object.

B. Description of Background Art

Electromagnetic radiation of wavelengths substantially shorter than visible light, specifically X-rays and gamma rays having wavelengths less than about 0.1 nm, are routinely used to obtain visually discernible images of internal or sub-surface features of an object, by a method referred to as radiography. For example, transmission X-radiography has been in use since shortly after the discovery of X-rays to obtain visual images of internal features of human bodies, such as bones and organs. Transmission X-ray radiographic images are created by exposing an X-ray sensitive device to X-ray radiation which has been transmitted through an object from a source of X-ray radiation. Historically, photographic film plates were among the first X-ray sensitive devices used for X-ray imaging, and are still widely used in the medical field. In transmission X-ray radiography using photographic film plates, an X-ray source such as an X-ray tube emits a generally conically-shaped beam of X-ray radiation which irradiates a distant film plate holder. An object such as a human being or selected portion of the human's body is positioned between the X-ray source and the film plate holder, and upon being suitably positioned relative to the film plate holder and X-ray source, held stationary at that position. The X-ray source is then momentarily energized for a relative short, e.g., 1-second time period which has been calculated to be just sufficiently long to form an adequate image in the emulsion of a photographic plate held in the plate holder. The exposure time is kept as short as possible because X-radiation has a cumulative destructive affect on biological cells. Therefore, the dosage; which is equal to the product of X-ray intensity multiplied by exposure time, is desirably kept as small as possible.

Some X-ray-ray radiation which irradiates an object such as a human body is transmitted with little attenuation, while rays which impinge on denser internal portions of the body, such as bone, are more heavily absorbed or scattered, thus forming in the emulsion of the photographic plate a shadow image of the denser object features. The film plate is developed and fixed by conventional film processing chemistry reactions and is kept as a permanent visual record for viewing and analysis by medical professionals. One variation of transmission X-radiography, called X-ray fluoroscopy, utilizes in place of a film holder, a screen which visibly fluoresces in response to X-radiation, enabling real-time dynamic viewing of internal object features.

Another variation of transmission X-radiography utilizes in place of a film plate or fluorescent screen a matrix array of photodetectors which are overlain by a scintillator material that produces flashes of light or scintillations when irradiated by X-ray-radiation. Electrical signals output from the photodetectors are amplified and processed to form an electronic image of X-radiation incident upon the plane of the photodetectors. The electronic image can be converted to a visual image by a cathode ray tube (CRT) or Liquid Crystal Display (LCD) display device of a television or computer monitor. The electronic image can also be input to a computer which uses display recognition software to automatically recognize contraband such as guns and explosives hidden in luggage examined by an X-ray radiography system.

To reduce the dosage of radiation on an object, some newer X-radiography systems uses a collimator made of an X-ray absorbing material such as steel, which has a slit-shaped aperture which thus deforms a conically-shaped X-ray beam into a relatively thin, vertically elongated, wedge-shaped fan beam of X-ray radiation. Such systems utilize a vertically disposed linear array of one or more columns of scintillator-type X-ray detectors positioned at a target plane located on the far side of an object field positioned between the collimated X-ray source and the target plane. A mechanism is used to cause the fan beam of X-ray radiation to horizontally scan the entire width or horizontal extent of an object to be imaged. One method for causing the fan beam of X-ray radiation to scan an object utilizes horizontal motion of the object, on a conveyor belt for example, to move the object relative to a fixed X-ray radiation source and detector array. Another scan method used in Computerized Tomography (CT) scanning utilizes rotation of the X-ray source and, synchronous orbital motion of the collimator and detector plane, so that the beam remains at a fixed location on the detector array as the beam traverses the width of a stationary object located in the object field.

Whichever method is used to effect relative horizontal motion between a fan beam of X-ray radiation on an object, each instantaneous position of the beam on a particular column of detectors in an array produces detector output signals indicative of features in a single narrow vertically disposed slice of the object. Thus, as the fan beam of X-ray radiation horizontally traverses the object and detector array, a sequence of electrical signals is output from the detectors. This sequence of output signals corresponding to a vertical stack of locations of an object, must be concatenated to form a horizontal array of concatenated, sequentially sampled vertical signal slices to form a two-dimensional image of the object.

Now, the number of detectors in a linear array is generally relatively large, corresponding to the vertical extent of an object field to be scanned. Thus, for example, a typical linear detector array may consist of 1024 square detector elements, each having a length and width of 2 mm. Thus, because simultaneous parallel processing of 1024 detector signal channels would required unnecessarily large and complex electronic signal processing circuitry, most signal processing circuitry currently used on scanning X-ray radiography systems sequentially samples the outputs of a vertical detector array. This is accomplished by using a multiplexer to sequentially transfer or present output signals from individual detectors in the array to a circuit component such as an analog-to-digital converter (ADC). The time required to sequentially sample the output signals from each column or line of detectors corresponding to a single vertical image slice of an object, referred to herein as a scan line, must be shorter than the time required for the fan beam to traverse the object slice to an adjacent object-space slice, to ensure that no object feature is missed. Thus, for example, if the object is moved relative to the X-ray fan beam at a speed of 200 mm per second and the width of the detector array is 2 mm, scanning a line of detector image data must be completed in less than 2 mm/200 mm/sec=$^1/_{100}$ second.

To accommodate requirements for different size object spaces, some scanning X-ray radiography systems in current use utilize a variable number of detector array boards, each having $2^n$ detectors per board, where n can be any desired number, depending on the size of the detectors and the desired vertical extension or height of the detector plane, which is a function of the object field size and the distances between the detector plane, object space, and X-ray source. A plurality of detector boards may be arranged end-to-end to increase the number of detectors and height of the detector image plane.

Usually, each detector array board includes in addition to an array of detector elements some of the signal processing circuitry required for a scanning radiography system to form electronic images. Typical signal processing circuitry includes pre-amplifiers, and gain and offset adjustment circuitry. The present invention was conceived in response to certain limitations of existing scanning radiography systems, which will now be described.

A first type of prior art detector array board arrangement for use in scanning X-ray radiography systems circuitry in use utilizes one or more identical X-ray detector array boards, each board having $2^n$ detectors. Typical numbers of detectors per board are 32, 64, 128, 256 or more. The first type of detector array board uses a single analog-to-digital converter (ADC). In this type board, a separate pre-amplifier is usually provided for each detector element in a detector array. Typically, each pre-amplifier includes a low-pass filter, and is sometimes referred to as a pseudo-integrator. The purpose of the low pass filter or pseudo-integrator is to develop an output voltage which is proportional to the time average of photodetector output currents produced in response to visible light scintillation photons which are produced in response to X-ray photons that irradiate the scintillator material, the visible photons in turn impinging on a photo-sensitive region of the photodetector. The low-pass transfer function of the pseudo-integrator is effective in averaging out statistical fluctuations in both the scintillator material photons and the photodetector output signal currents, thus reducing system noise.

In the first type detector array board for scanning digital radiography systems, the output terminal of each pre-amplifier or pseudo-integrator is connected to a separate input terminal of an analog multiplexer circuit. The output terminal of the multiplexer is in turn usually connected to an input terminal of an analog gain/offset compensation circuit, which in turn has an output terminal that is coupled through an analog switch to a board signal output terminal. Analog signals input by each detector pre-amplifier/pseudo-integrator circuit are sequentially transmitted through the multiplexer, under command of signals from a scan and transfer control circuitry which may be located on the board. Output signals from a single board or a plurality of detector array boards are sequentially input to a single ADC, which may be located exterior to the boards.

The first-type of detector array board for scanning X-ray radiography system requires a relatively fast ADC. Thus, a system with 1,000 detectors scanning at 200 lines per second requires an ADC conversion rate of 200 KHZ. Practical systems of this type in reality generally require a faster ADC, since time must be allowed for address decoding and settling time of signals on cables and buses. To reduce photon noise statistics without requiring the complexity and cost of utilizing true integrator circuits in each detector signal processing channel, each detector channel generally includes a pseudo-integrator (essentially a low-pass filter), which accumulates a new output signal that delays at a known rate to allow input and accumulation of a new signal of a new scan line. This circuit implementation requires only a single operational amplifier per detector channel. Selecting the time constant for the pseudo-integrators is a trade-off between signal-to-noise ratio and image sharpness. A shorter time constant will result in a sharper image but more photon statistic noise. Each detector array board of the first type is usually provided with gain and offset adjustment circuitry, which is used to tailor board operation to a particular system size, X-ray source type and strength, and system geometry.

Scanning X-ray radiography systems using a single ADC require transmission of analog signals through a cable/bus which may be many feet long; therefore, such systems are subject to noise interference from the environment. To reduce noise susceptibility, a second-type of prior art detector array board for scanning X-ray radiography systems currently in use utilizes a separate ADC for each board. Since placing a separate. ADC on each board increases the cost of each board, such boards often are provided with true integrators in place of pseudo-integrators. In this second, true integrator board, the signal output of each detector is captured by a separate analog integrator during each scan line. At the end of the scan line, charge from each integrator is transferred to a separate sample-and-hold circuit. Each integrator circuit is then reset by discharging its storage capacitor. During the next scan line, while new data is collected into the integrators, analog signals from each sample-and-hold circuit are input to an analog multiplexer and are sequentially output from the multiplexer through a gain/offset compensation circuit to an on-board ADC. Digital output signals from the ADC are transferred under the control of scan and transfer control circuitry to a host computer.

Since the second type, true-integrator board is provided with a separate, on-board ADC, analog signal paths are limited to a few centimeters, and confined to a shielded environment provided by an electrically conductive box which encloses components of the detector array board. The cost and complexity of each second type, true integrator detector array board is substantially greater than that of the first-type, pseudo-integrator board described above. This increase results from the larger number of components required for the true integrator circuits, sample-and-hold circuits, switching circuits, additional ADC and control logic. For example, each detector channel of the true-integrator detector array board requires 2 operational amplifiers and 2 analog switches. However, data output from the true integrator detector array board is less susceptible to photon statistic noise. Typically, the ADC is this type system samples each detector channel only once per scan line and passes converted data to an external host computer for image processing.

A third type of detector array board used in scanning X-ray radiography systems utilizes a plurality of n ADC's on each board, each ADC having an input terminal connected to the detector pre-amplifier output terminal of a separate detector channel. The digital output signal from each of the n ADC's is input to a register or memory storage location where it is accumulated to thereby effect digital integration. Digital integration boards of this type eliminate the requirement for all analog switching and signal processing functions, thus eliminating generation of spurious electronic noise. Such digital integrator boards generally use ADC's with relatively great resolution, e.g., 20 bits or higher, and produce a high quality image signal at high cost.

All prior art detector array boards for use in scanning X-ray radiography systems, including the three types described above produce output signals which must be further processed to produce electronic images of objects. Typically, the additional signal processing is performed in a data acquisition module located in a digital signal path between a host computer and detector array board or boards, but may optionally be performed solely within the host computer.

Each of the three detector array board types described above has certain less than optimum characteristics. For example, in a typical system which uses boards pseudo-integrators and a single ADC, the analog signal output from each pseudo-integrator of each detector channel is sampled and digitized once per scan line. In this implementation, selecting a time constant for the pseudo-integrator that is relatively long will result in low photon-statistic noise, but if the time constant is too long, electronic images derived from the signals will be blurred. A shorter pseudo-integrator time constant will result in a sharper image, but if made too short, variations in image brightness caused by photon statistic variations will become noticeable, particularly in low signal areas, and result in a grainy image. The foregoing constraints on pseudo-integrator time constants dictate that the time constant be reduced if the system scan rate must be increased, requiring that time-constant determining components of the pseudo-integrators be changed, which is usually only practicable by physically interchanging boards having components with different values.

In the second type, true-integrator detector array board described above, a practical limitation is imposed on board performance by a limitation in the amount of charge that each detector channel integrator circuit can hold. Using the same integrator circuits in a system with high power X-ray-ray sources or longer integration times can cause the charge storage capacitor of an integrator circuit to reach a maximum, saturated level while the detector output signal is still increasing, thus causing image information to be lost. To avoid integrator saturation resulting from higher detector output signals and/or slower scan times, it is necessary to change the value of the integrator storage capacitor to one having a higher value of capacitance. As a practical matter, this generally requires physically interchanging boards having the different components.

As mentioned above, the third type detector array board implementation which has a separate ADC for each detector channel avoids the limitations of the pseudo-integrator and true integrator boards described above, but is costly.

In view of the performance limitations and/or undesirably high cost of prior art detector array boards of the type described above, the present inventor developed a novel and improved system and methods for processing X-ray image data, which systems and methods are the subject matter of the present disclosure and described below.

OBJECTS OF THE INVENTION

An object of the present invention is to provide an apparatus for the electronic signal processing of output signals from an array of X-ray detectors which are irradiated by X-ray radiation transmitted through an object from a source beam of X-ray radiation that scans the object, to convert the detector to output signals to a digital output signal suitable for concatenation to thereby form an electronic image of the object.

Another object of the invention is to provide a detector array board for processing signals from a plurality of X-ray radiation detectors arranged in an array in which an output signal output from each individual detector is repeatedly and separately sampled during a single scan-line time period corresponding to a single object image slice formed by a fan beam of X-ray radiation which scans an object.

Another object of the invention is to provide an X-ray detector array board in which output signals from a plurality of detector channels are sequentially sampled and digitally accumulated multiple times during a scan-line time period corresponding to the dwell time of a fan beam of X-ray radiation forming on a detector plane a single image slice of an object.

Another object of the invention is to provide an X-ray-ray detector array board in which signals output from a plurality of X-ray radiation detectors are each sampled during each of a plurality of scan lines of an object field raster sampled repetitively and periodically P times and accumulated in a digital integrator to thereby increase signal-to-noise ratio of a board output signal by a technique called Time Share Digital Integration (TSDI).

Another object of the invention is to provide an X-ray detector array board system which utilizes Time Share Digital Integration for each board, and multiple batch processing of detector channels of a plurality of boards, to thereby minimize artifacts in an electronic image formed by concatenating digital signals output from the plurality of boards.

Another object of the invention is to provide an X-ray detector array signal processor board which employs a true integrator in the output path of each of a plurality of detector channel signals, sequential and multiple sampling of outputs of each of the integrators, digital accumulation of the output signal, discharging the integrator storage element, and repeatedly sequentially sampling the output of each integrator, thereby preventing saturation of the integrator storage element for a high dosage of X-radiation incident upon the detectors during the dwell time of X-ray radiation on the detector array for a single scan line time period corresponding to a single object image slice.

Another object of the invention is to provide an X-ray detector array signal processor board which utilizes Time Share Digital Integration and two memory blocks which are cyclically and alternately re-configured to perform input data scans and data output transfer functions, respectively, thus increasing throughput rate of the board.

Various other objects and advantages of the present invention, and its most novel features, will become apparent to those skilled in the art by perusing the accompanying specification, drawings and claims.

It is to be understood that although the invention disclosed herein is fully capable of achieving the objects and providing the advantages described, the characteristics of the invention described herein are merely illustrative of the preferred embodiments. Accordingly, I do not intend that the scope of my exclusive rights and privileges in the invention be limited to details of the embodiments described. I do intend that equivalents, adaptations and modifications of the invention reasonably inferable from the description contained herein be included within the scope of the invention as defined by the appended claims.

SUMMARY OF THE INVENTION

Briefly stated, the present invention comprehends improved methods and apparatus for electronic signal processing of signals output from X-ray radiation detector arrays used in imaging X-ray radiography systems. According to one aspect of the invention, output signals from individual preconditioning amplifier circuits connected to individual X-ray radiation detector elements of an array are input to a multiplexer sub-system which includes at least one multiplexer and output to a post-conditioner circuitry sequentially and multiple times during a single scan-line time period corresponding to the dwell line of X-ray radiation signals emanating from a single slice of an object scanned by a fan beam of X-ray radiation emitted by an X-ray radiation source. Analog signals output serially from the post-conditioning circuitry are input to an analog-to-digital converter (ADC), which outputs a digital signal proportional to the magnitude of an output signal of each detector element. The ADC output signal is conveyed under direction of scan and transfer control circuitry to a plurality of separate registers or memory locations, one for each detector channel. Under control of the scan and transfer control circuitry, the analog output signal from each detector channel pre-conditioning circuit is selected by the multiplexer, sequentially sampled and converted by the ADC to a digital signal P times. The P digital signals are added digitally in an accumulator which has a storage location resident in a register or electronic memory space. The accumulated signal corresponds to the addition of P output signals from a detector element, and is subsequently multiplied by a scaling factor, e.g., 1/P, to thereby produce a time-averaged detector output image signal which is proportional to a time average of detector output signals. Importantly, the time averaged signal has a greater signal-to-noise ratio than a single sampled detector output signal, the noise being reduced by the factor $1/\sqrt{P}$. The novel and improved signal processing method described above is referred to herein as Time Share Digital integration (TSDI).

After the output signal of a selected detector channel has been sampled P times, the multiplexer input select line is incremented to the next detector channel, and a digital output signal from the ADC is accumulated in a separate register or memory storage location and subsequently scaled as described above.

A basic embodiment of a Time Share Digital Integration (TSDI) detector array board according to the present invention includes a liner array of $2^n$ X-ray radiation photon detectors, where $2^n$ is any desired number, for example 32, 64, 128, 256, etc. Each of the photo detectors has an output terminal connected to the input terminal of a separate analog pre-conditioner circuit (PC). Each pre-conditioner circuit typically and preferably includes a pre-amplifier, which is desirably an operational amplifier. Each pre-amplifier circuit may have associated therewith a low-pass filter, in which case the pre-amplifier/low-pass filter circuit combination is referred to as a pseudo-integrator. Optionally, the pre-amplifier may include or be configured as a true integrator, in which case each PC circuit must be provided with a shunt switch for discharging the storage element, usually a capacitor, of the true integrator circuit. Each true integrator circuit may also be coupled to a separate sample-and-hold circuit, in which case a separate series switch is preferably provided between the output terminal of each true integrator circuit and each sample-and-hold circuit.

Time Share Digital Integration Detector array boards according to the present invention also include at least one multiplexer which has a plurality of $2^n$ input terminals and an output terminal which is preferably connected to post-conditioning circuitry. The latter preferably includes adjustable gain and offset compensation circuitry for adapting the board to different X-ray signal strengths, scan times, geometries, etc. Also, each post-conditioning circuit has an output terminal which is connected to an analog-to-digital converter (ADC), the ADC having a digital output signal terminal which is sequentially switched to a separate accumulator storage location for each channel, the storage locations comprising separate registers or memory locations.

Each TSDI detector array board also includes a scan and transfer control circuitry block which generates command signals for controlling operation of other circuits of the board in performing the functions described above. The scan and transfer control circuitry utilizes internal software, and may optionally be responsive to optional hierarchical command signals from a host computer, to effect output of integrated and scaled digital image signals corresponding to the image of an object-formed on the detectors of the detector array board by X-ray radiation transmitted through the object.

A TSDI system apparatus according to the present invention utilizes one or more TSDI detector array boards, and circuitry for concatenating data sequentially output from the board or boards into an electronic raster image formed by X-rays transmitted through an object by a fan beam of X-ray radiation which scans the object. The plurality of boards of a TSDI system according to the present invention typically includes a configuration in which linear X-ray detector arrays are arranged end-to-end in a direction corresponding to the height of a fan beam, but may also include an arrangement of detector array boards in which some detector arrays are stacked side-by-side, i.e., in the direction which the fan beam scans an object space.

According to another aspect of a Time Share Digital Integrator signal processing method of the present invention, a batch or Multi-Scan technique is used to minimize image artifacts caused by the decay of signals stored in pseudo-integrator circuits, which occurs when a relatively long period of time is required to repeatedly sample the output of each detector in a long series of detectors, e.g., of a single board having a long linear array of detectors, and/or a stack of multiple detector boards having a large number of detectors.

The Multi-Scan technique according to the method of the present invention includes the steps of repetitively sampling analog output signals of a first detector P times to reduce noise as in the basic embodiment of the invention described above, and sequentially sampling each of the $(2^n-1)$ remaining detector channel output signals of a board. According to a basic method of the present invention, each of the $2^n$ detectors in a line of a boards is sampled in parallel in the same manner, so that at the end of a long detector array, a relatively long delay time between sampling the first detector on each board and the last detector of each board allows the voltage stored on the last pseudo-integrator capacitor to decay to a substantially smaller value than was sampled from the first detector of each board. This results in an artifact manifested by a jagged image line.

The Multi-Scan method of the present invention substantially reduces the magnitude of the above-described artifact, as follows. First, each detector in a plurality of M detector array boards is simultaneously sampled P times. The sums of the P samples of each of the sequence of $2^n$ detector channels of the boards are sequentially accumulated in $2^n$ separate accumulator locations, to comprise a first "batch" of a sequence of Q batches. The detector output signals of each board in a series of boards is then sampled in the same manner in a second batch scan. After the last batch-scan Q of a stack of boards has been made, the time-average digital signal accumulated in each detector channel accumulator is time-averaged not only relative to P times the sampling time for P consecutive samples of each sampling sequence, but also over the larger time period required to make Q batch scans. Therefore, when values stored in the digital accumulator for each detector channel are read-out and scaled, variations in outputs from the first detector accumulated signal values and the last detector output signals which result from widely separated sampling times are greatly reduced, since the Q sequential batch samplings of all detector channels is distributed throughout the capacitor-voltage decay time curve.

According to another aspect of the invention, a variation of the novel Multi-Scan method can be used to increase the dynamic range of TSDI boards which employ a true integrator in the pre-conditioner circuit (PC) of each detector output channel. Thus, sequentially sampling the sample-and-hold circuit of each detector output signal in a true integrator board results in reduced electronic noise as explained above for the operation of a TSDI board which uses pseudo-integrators. However, detector output channel integrators can become saturated as a result of larger signals and/or long integration times corresponding to slower scanning speeds.

According to a method of the present invention, integrator saturation can be avoided to thereby increase the dynamic range of a TSDI board, by the following technique. First, the scan and transfer control circuitry block of a TSDI board provided with true integrators is configured to sequentially sample the sample-and-hold output signal of each integrator for a time period or "segment" which is less than the time period of a scan line, and also short enough to ensure that the integrator capacitor will not become saturated for the largest detector signal of the chosen dynamic range. The output signals from the sample-and-hold circuits are converted to digital values by the ADC and accumulated and scaled, using the segment time interval as a virtual scan line. Upon completion of the sampling and scaling of this first segment, the integrator capacitor is discharged. The sample-and-hold of the next detector channel is then sampled and converted to a digital signal, scaled and accumulated while the first detector channel integrator capacitor is charging up at the end of this interval. After the last detector channel has been sampled, the signal output of the first channel in a second segment is once again sampled, and the integrator capacitor is again discharged at the end of the second segment. The sum of the time segments is less than time period of a scan line, and at the end of scan line, detector signals accumulated during each of the segment times are scaled and output. Since the accumulation of charge in each integrator capacitor, proportional to X-ray radiation dosage of a detector, is limited to a time period shorter than that of a scan line, saturation resulting from an integrator capacitor charging up to an output voltage equal to the operational amplifier supply voltage is prevented.

In the Multi-Scan method described above for data transfer at the end of each scan line, the steps of sampling of detector analog output signals, conversion of the output signals to digital values, accumulation of the digital values in a register or memory storage location, scaling of the values and sequential transfer of the scaled values from a detector array board for concatenation to form an electronic image raster, are all performed in the same time frame allocated to scan a line. This method saves register or storage space, but wastes time in waiting for detector data to settle, data to be scaled and data to be transferred. However, as described above, it is desirable to repeat the multiple scanning batches of all detectors of a detector board multiple times. The larger number of times this multiple batch scanning is repeated, the less will be the magnitude of the artifact caused by end-to-end detector data-mismatching resulting from decay of charge in the pseudo-integrator capacitors. Also, time is wasted in waiting for data to be stable each time the address of a detector channel is switched, to enable processing signals from the next detector channel in a sequence. For example, if the required waiting time for a signal to settle or stabilize on a switched signal line is one microsecond, a detector array board with 64 channels will lose 64 microseconds of processing time every iteration through the detector array.

Further reduction in time available for sampling detector data results from the time required to cycle through memory locations to access data. Also, if scaling accumulated digital detector data signals involves multiplying or dividing an accumulated value by an arbitrary number, processing time can be significant. Reduction of data access time can be effected by providing registers for data storage, rather than memory locations.

Digital values representing image information obtained from each detector must ultimately be output from a detector array board to a host computer, either directly or Into a digital acquisition module, where data from multiple image slices of an object obtained on one or more detector array boards is concatenated to form a complete electronic raster image of the object. The electronic image is used by the host computer or other external equipment to produce a visual image and/or be processed by pattern recognition software to detect guns, explosives, etc. Since a typical system according to the present invention has a thousand or more detectors, the time required for outputting image data can become significant. Although various high speed data transfer techniques such as LVDS (Low Voltage Differential Signal) are available, implementing such techniques on each detector array board can significantly increase the cost of the board because of the number of required components and their cost. Preferably, therefore, in accordance with one aspect of the present invention, detector array board data transfer rates are increased by the following method.

An increase in the data transfer rate of detector array boards according to the present invention utilizes two memory storage banks or blocks which have functions that are cyclically interchanged, or "ping-ponged." A first of the two memory banks, referred to as "bank zero" for example is used during a first time interval to accept scaled detector scan data. During this first time interval, a second memory bank, referred to as "bank one" is configured to transfer previously stored detector array data off of the detector array board. This configuration is accomplished by digital switches. At the end of the first time interval, bank zero, which now contains a full line of detector values, is re-configured from a Scan-Data-Receive configuration to a Data-Transfer.-From-Board configuration. This reconfiguration is accomplished by digital switches. At the end of the first time interval, a second time interval starts in which data stored in bank zero is transferred off the board. During this second time interval, a second line of detector data is stored in bank one. At the end of the second time interval, the configuration of bank zero is switched back to a Scan Data Receive configuration, and bank one is simultaneously re-configured to a Data Transfer configuration. The re-configuration of memory banks zero and one is performed in response to switching signals from the scan and transfer control circuitry block, on a cyclical basis. In this mechanization, input of one line of data occurs during the same time interval that data from a previous scan line is being transferred out from the board. Thus, the data throughput interval of a board is decreased from the sum of the time interval $t_s$ required for scanning a line of data into memory and the time interval required to transfer a line of data out from the board, to the longest of those two intervals. Thus, this ping-pong mechanization increases the detector array data throughput rate from $1 \div (t_s + t_t)$ to $1 \div$ (the largest of $t_s$ or $t_t$).

BRIEF DESCRIPTION OF THE DRAWINGS

FIG. 3 is a schematic diagram of prior art signal conditioning circuits used for X-ray detector signal processing, in which FIG. 3A shows a pre-amplifier and FIG. 3B shows a pseudo-integrator circuit.

FIG. 7 is a diagrammatic view of a fan beam X-ray radiography system according to the present invention.

FIG. 9 is a block diagram of a basic embodiment of Time Share Digital Integration (TSDI) boards according to the present invention, in which FIG. 9A shows a TSDI board having a single ADC and multiplexer.

FIG. 10 is a more detailed block diagram of the detector array board of FIG. 9A, which uses pseudo-integrators.

FIG. 11 is a timing diagram showing basic time relationships between signal processing events of the TSDI board of FIG. 9.

FIG. 13 is a diagrammatic view illustrating the source of an image artifact resulting from a "sample until done" system operational mode of a TSDI board of the type shown in FIG. 9, which uses pseudo-integrator detector pre-conditioner circuits.

FIG. 14 is a timing diagram showing certain timing aspects of a Multi-Scan operational mode for the TSDI board of the type shown in FIG. 9, in which artifacts of the type shown in FIG. 13 are reduced.

FIG. 15 is a diagrammatic view illustrating how visual artifacts of the type shown in FIG. 13 are reduced using the Multi-Scan method shown in FIG. 13.

DESCRIPTION OF THE PREFERRED EMBODIMENTS

The structure and function of a Time-Share Digital Integration (TSDI) method and apparatus according to the present invention, and certain novel and advantageous improvements in X-ray radiography systems afforded by the method and apparatus, may be best understood by first reviewing the construction and function of some prior art X-ray radiography systems.

Figure 1:
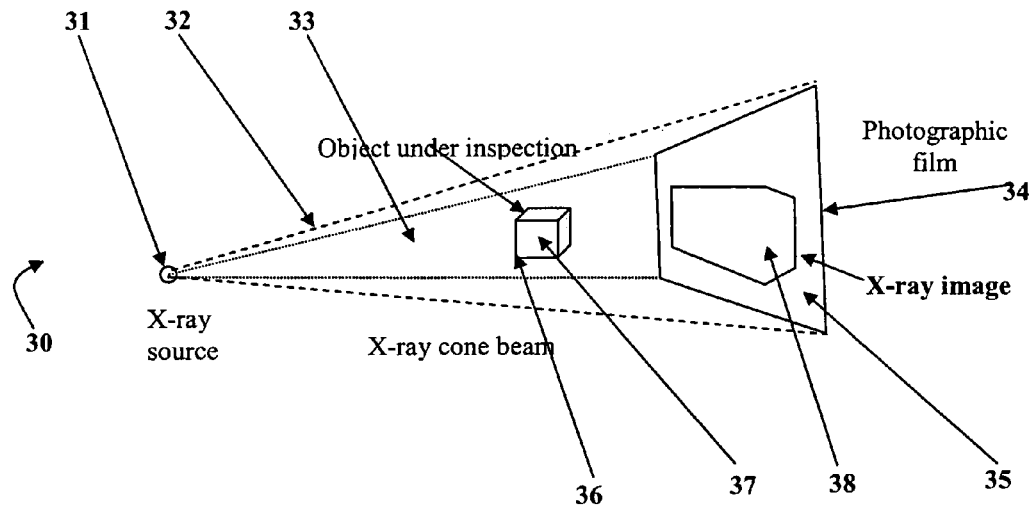
FIG. 1 is a perspective view of a prior art X-ray radiography system of a type which utilizes a cone of X-ray radiation to flood an object field.

FIG. 1, shows a basic prior art X-ray transmission radiography system for obtaining images of internal features of human bodies, cargo containers, luggage or the like. As shown in FIG. 1, a typical prior art X-ray radiography system 30 includes a source of X-ray radiation 31 such as an X-ray tube, which produces a generally conically-shaped beam of X-ray radiation 32 that irradiates or illuminates an object space 33 and an image plane 34 located on a side of the object space opposite that of X-ray radiation source 31. At the image plane 34 is located a device for detecting X-ray radiation such as a fluorescent screen, planar array of X-ray detectors or a photographic film plate 35. Some X-ray radiation 36 which irradiates an object 37 such as a suitcase or cargo container is transmitted with little attenuation onto an X-ray detector device 35, while X-ray radiation which impinges on denser interior materials, e.g., a metal gun, of the object, are absorbed or scattered, thus forming a shadow image 38 of internal object features on X-ray detector device 35.

Figure 2:
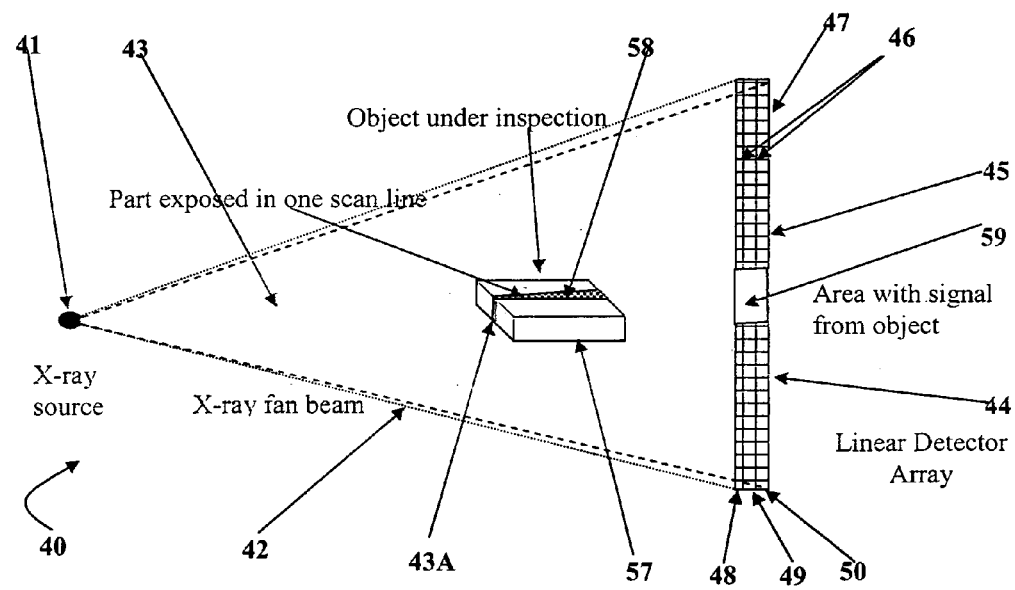
FIG. 2 is a perspective view of a prior art X-ray radiography system of a type which utilizes a vertically elongated fan beam of X-ray radiation which irradiates an object field.

FIG. 2 illustrates a second type prior art X-ray radiography system 40 which utilizes a fan beam X-ray radiation source 41 that includes a slit-shaped collimator (not shown) made of an X-ray absorbing material such as steel, which deforms a conically-shaped X-ray beam emitted by an X-ray tube into a relatively thin, vertically elongated wedge-shaped fan beam 42 of X-ray radiation. The fan beam 42 illuminates a vertically elongated, rectangularly-shaped slice 43A of an object space 43 and an image plane 44 located one a side of the object opposite to that of X-ray radiation source 41. At the image plane 44 is located at an X-ray radiation detection device 45 which consists of a vertical column of individual X-ray radiator detector elements or detectors 46. Each X-ray radiation detector element produces an electrical output signal proportional to or indicative of the intensity of X-ray radiation incident upon the detector element, and the period of time that the X-ray radiation irradiates the detector element, the product of intensity, multiplied by time typically being referred to as dosage. Some X-ray radiation detector elements consist of suitably doped P-N semiconductor junction diodes, or blocks of semiconductor material, which converts X-ray photons incident upon the material directly to hole-electron pairs, which in turn produce an electrical current. Another type of X-ray radiation detector element consists of a photo diode which has a scintillator material positioned in front of the entrance aperture of the photo-diode. The scintillator material produces a fluorescent scintillation of light consisting of visible photos when irradiated by an X-ray photon.

The visible photons in turn impinge on the entrance aperture of the photo-diode to thus produce therein photo currents which are indicative of the magnitude of X-ray energy incident upon the scintillation material.

As shown in FIG. 2, X-ray radiation detector 45 consists of a vertically disposed array 47 of individual X-ray radiation detector elements 46, which may have any desired shape, but typically are square-shaped. Array 47 includes at least one column 48 of detector elements, but may include additional adjacent columns such as 49 and 50, as shown in FIG. 2.

Referring still to FIG. 2, it may be seen that fan beam 42 of X-ray radiation emitted by X-ray radiation source 41 illuminates an object space 43 and an image plane 44 located on a side of the object space opposite that of X-ray radiation source 41. Fan beam 42 intersects an object 57 positioned in object space 43 to form therewith a wedge-shaped intersection or irradiation volume 58 which has a generally uniform horizontal cross section. Internal features of irradiated object volume 58 which absorb or scatter incident X-ray radiation, such as a metal gun, form a shadow image 59 of the object on X-ray radiation detector array 47. Image 59 in turn causes detector elements 46 to output electrical signals indicative of contrast features of the image.

Since at any instant, image 59 only represents a thin vertical slice of an object 57 in object space 43 of fan-beam system 40, it is necessary to provide a mechanism for producing relative horizontal motion between object 57 and fan beam 42, so that intersection region 58 of the beam with the object eventually traverses the entire width of the object. One method for causing fan beam 42 to traverse the entire width of object 57 is to move the object horizontally with respect to the beam, by placing the object on a moving conveyor belt, for example. Another method of causing fan beam 42 to traverse the width of an object 57 in object space is to provide a mechanical scanning mechanism which rotates X-ray radiation source 42, and synchronously orbits detector array 47. With this method, fan beam 42 traverses or scans the width of object space 57, while striking a fixed location on detector array 47.

Whatever method is used to effect relative horizontal motion between X-ray radiation fan beam 42 and object 57, each instantaneous position of that portion of the beam which is transmitted through the object and onto image plane 44 forms on a particular column array of detectors, e.g., column 48, shadow image 59 of an object slice. Shadow image 59 in turn irradiates detector array 48, causing each detector element 46 of the array to output an electrical signal indicative of features of the image. As fan beam 42 horizontally scans the width of an object, a sequence of electrical signals is output from detector elements 46. This sequence of signals-corresponds to a sequence of side-by-side images 59 of slices of object 57, which must be assembled or concatenated to form a horizontal array or raster of vertical image slices which comprise a complete electronic image signal corresponding to a full-width, two-dimensional image of the object. As a practical matter, the concatenation process requires that analog signals output by detector elements and indicative of object image features be first converted to digital signals. Prior art methods for performing this conversion are now described.

Since the output signal of each detector element 46 of an array 47 of X-ray radiation detectors is usually quite small, the output signal must be amplified before being converted to a digital value by an analog-to-digital converter (ADC). FIG. 3A illustrates a first-type of prior art pre-amplifier circuit 61 for amplifying the output signal of a detector element. As those skilled in the art will recognize, pre-amplifier circuit 61 utilizes a conventional integrated circuit operational amplifier and associated gain adjustment resistors.

FIG. 3B illustrates a second-type pre-amplifier circuit 62 which includes in addition to an operational amplifier, circuit components that form with the operational amplifier a low-pass filter circuit, sometimes referred to as a pseudo-integrator. The purpose of pseudo-integrator 62 is to develop an output voltage which is proportional to the time average of photodetector output currents produced in response to visible light scintillation photons that are produced in response to X-ray photons of image 59 which irradiate scintillator material on detector elements 46.

Figure 4:
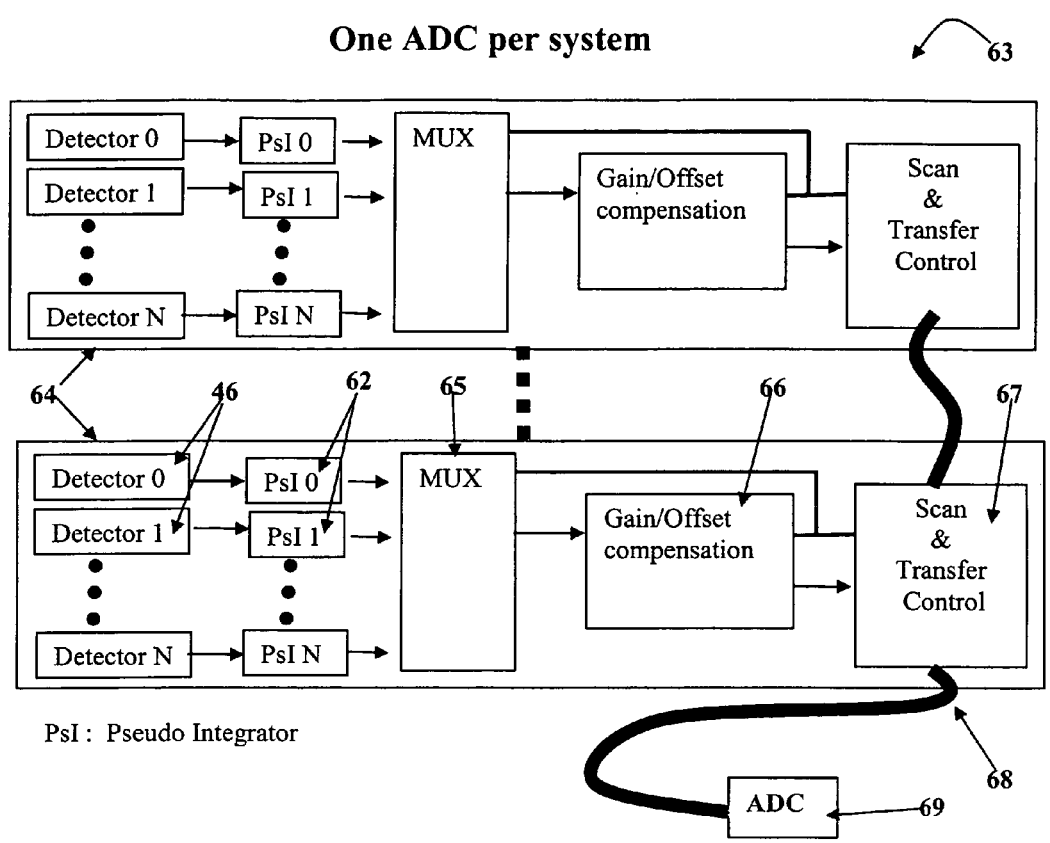
FIG. 4 is a block diagram of a first-type prior art digital X-ray radiography detector array board signal processing system.

FIG. 4 illustrates a first type of prior-art signal processing electronics for an X-ray radiography system 63 which utilizes one or more of a first type of prior-art detector array board 64. Each detector array board includes a plurality of detector elements 46, each having an output terminal connected to the input terminal of a separate pseudo-integrator 62. The output terminal of each pseudo-integrator 62 is connected to a separate input terminal of an analog multiplexer 65. The output terminal of multiplexer 65 is in turn connected to the input terminal of an analog gain/offset compensation circuit 66, which has an analog output terminal that is connected through analog switching elements (not shown), under a control of scan and transfer control circuitry 67, to an output terminal 68 of board 64. Output terminals of a single board 64 or a plurality of boards 64, for example, two boards, as shown in FIG. 4, are sequentially and electronically input to a single ADC 69, which may be located exterior to the boards. The first-type of detector array board for scanning X-ray radiography system requires a relatively fast ADC. Thus, a system with 1,000 detectors scanning at 200 lines per second requires an ADC conversion rate of 200 KHZ. Practical systems of this type in reality generally require a faster ADC, since time must be allowed for address decoding and settling time of signals on cables and buses. To reduce photon statistics noise without requiring the complexity and cost of utilizing true integrator circuits in each detector signal processing channel, each detector channel generally includes a pseudo-integrator, which accumulates a new output signal that delays at a known rate to allow input and accumulation of a new signal of a new scan line. This circuit implementation requires only a single operational amplifier per detector channel. Selecting the time constant for the pseudo-integrators is a trade-off between signal-to-noise ratio and image sharpness. A shorter time constant will result in a sharper image but more photon statistic noise. Each detector array board of the first type is usually provided with gain and offset adjustment circuitry, which is used to tailor board operation to a particular system size, X-ray source type and strength, and system geometry. Scanning X-ray systems which use a single ADC require transmission of analog signals through a cable/bus which may be many feet long, so such systems are subject to noise interference from the environment. To reduce noise susceptibility, a second type of prior-art detector array board may be used which is provided with a separate ADC on each board.

Figure 5:
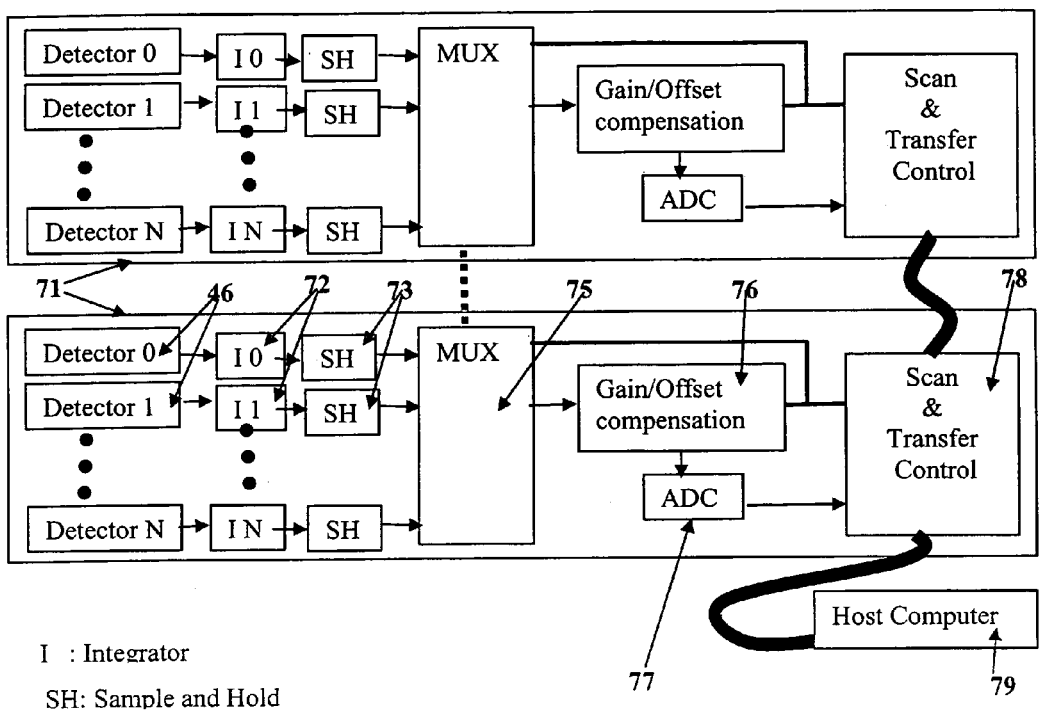
FIG. 5 is a block diagram of a second-type prior art X-ray radiography signal processing system.

FIG. 5 illustrates a second-type 70 of prior art signal processing electronics for X-ray radiography systems which utilizes a second-type of prior art detector array boards 71. As shown in FIG. 5, the output terminal of each detector element 46 is connected to the input terminal of a separate true integrator circuit 72, which has an output terminal connected to the input terminal of a separate sample-andhold circuit 73. The output terminal of each sample-and-hold circuit 73 is connected to a separate input terminal of an analog multiplexer 75. The output terminal of multiplexer 75 is in turn connected to the input terminal of an analog gain/offset compensation circuit 76, which has an output terminal connected to the input terminal of an on-board ADC 77. True integrator board 72 also has a scan and transfer control circuitry block which is effective in placing on an output terminal 79 of the board a sequence of digital signals received from on-board ADC 77.

Operation of the second-type, true-integrator prior art signal processing board is as follows. At the end of a scan line, charge from each integrator is transferred to a separate sample-and-hold circuit by a separate one of a plurality of analog switches (not shown). Each integrator circuit capacitor is then discharged by a separate one of a plurality of shunt analog switches (not shown). During the next scan line, while new data is collected into integrator circuits 72, analog signals from each sample-and-hold circuit 73 are input to multiplexer 75 and sequentially output from the multiplexer through gain/offset compensation circuitry 76 to on-board ADC 77. Digital output signals from ADC 77 are output from board 71 under control of scan and transfer control circuitry block 78 to a host computer 79, for concatenation into an electronic image.

Figure 6:
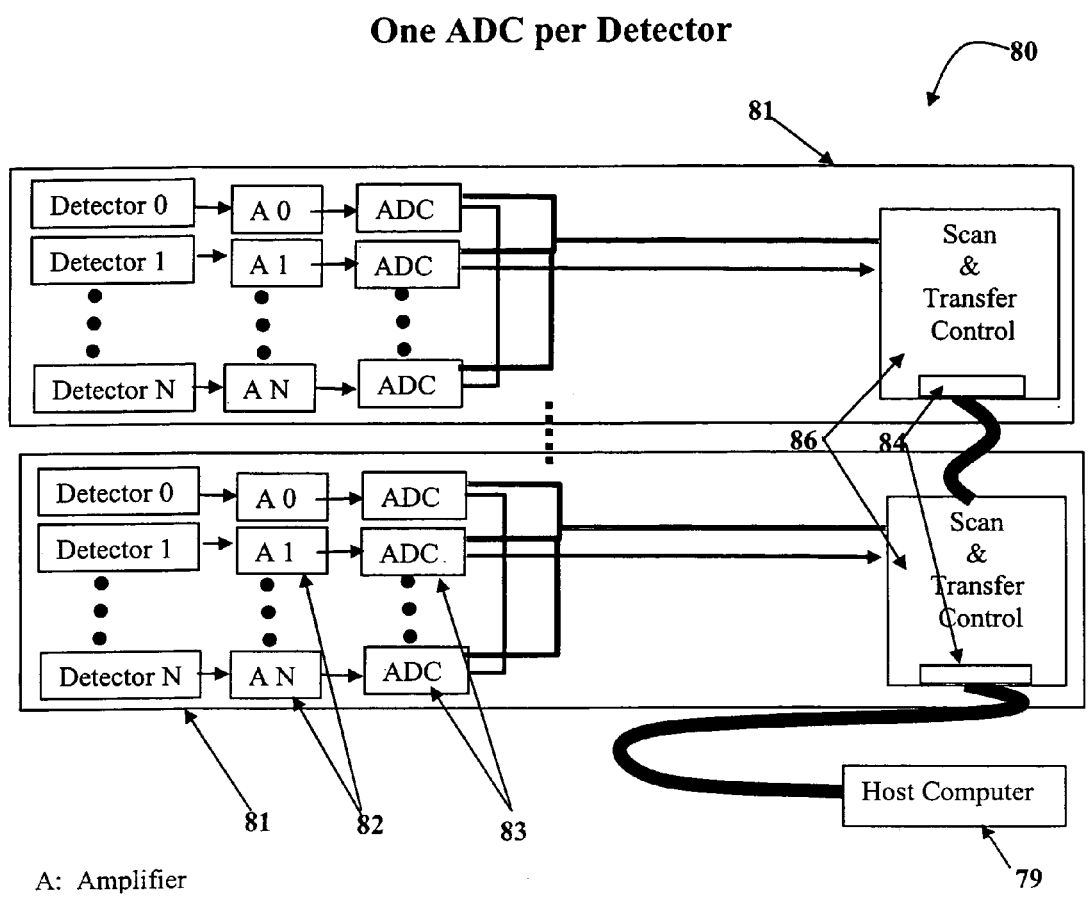
FIG. 6 is a block diagram of a third-type prior art X-ray radiography signal processing system.

FIG. 6 illustrates a third-type 80 of prior-art signal processing electronics for X-ray radiography systems, which utilizes a third-type prior detector array board 81.

As shown in FIG. 6, each detector element 46 of board 81 has an output terminal connected to the input terminal of a separate pre-amplifier circuit 82. Each pre-amplifier circuit 82 in turn has an output terminal connected to the input terminal of a separate on-board ADC 83. Output signals of the multiple ADC's are in turn input under control of scan and transfer control circuitry block 84 to a register 86 or memory storage locations (not shown). Here data from the respective detector channels is accumulated to thereby effect digital integration. Digital integration boards of this third type eliminate the requirement for all analog switching and signal processing functions, thus eliminating generation of spurious electronic noise. Such digital integrator boards generally use ADC's which have relatively high resolution, e.g., 20 bits or higher, and produce high quality images but are quite costly.

FIG. 7 illustrates a basic embodiment of a fan-beam X-ray radiography system 90 according to the present invention. As shown in FIG. 7, system 90 includes an X-ray radiation source 91 which produces a fan-shaped beam 92 of X-ray radiation that irradiates an object space 93 and an image plane 94 located at the far side of the object space. At image plane 94 is located at least one detector array board 95 according to the present invention, each board 95 having thereon an array 97 of X-ray radiation detector elements 96 arranged in a column array, which, in the present example, is oriented vertically, but could optionally be oriented in any desired direction. As shown in FIG. 7, a plurality of boards 95, e.g., four, are arranged with detector arrays 97 thereon stacked end-to-end. However, other arrangements of the plurality of boards 95 may optionally be chosen, such as side-by-side or a combination side-by-side and end-to-end arrangement, e.g., four end-to-end boards each in two or three columns. Also, it should be noted that the detector arrays 97 could be located external to boards 95, although the preferred location is on the boards.

Figure 8:
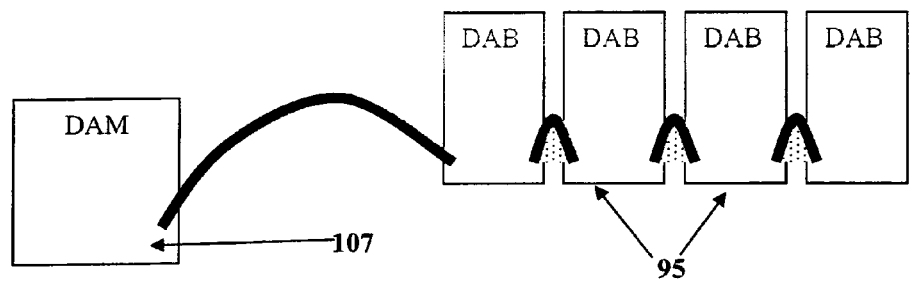
FIG. 8 is a block diagram showing an X-ray radiography signal processing system which employs Detector Array Boards (DAB's) according to the present invention.

FIG. 8 shows electrical interconnections between a plurality of detector array boards (DAB's) 95 and a digital acquisition module (DAM) 107 according to the present invention.

Figure 9B:
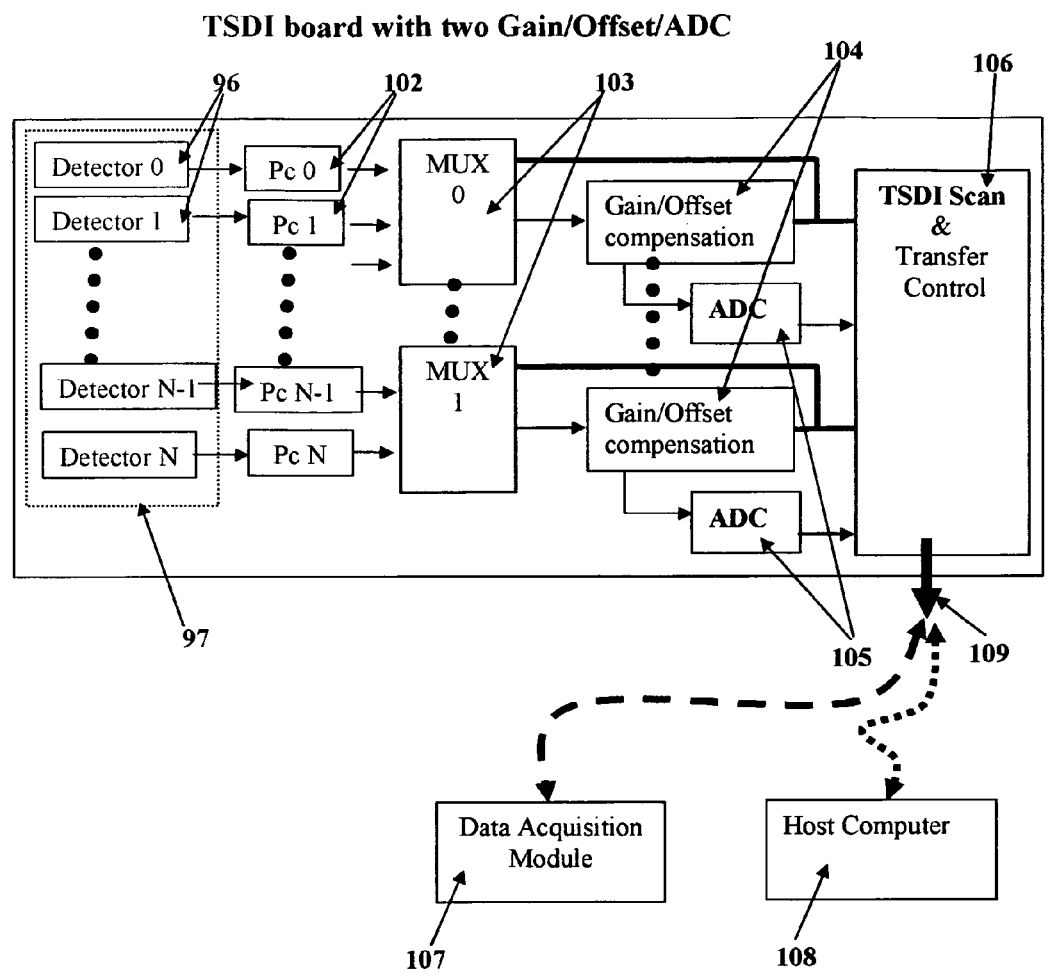
FIG. 9B shows a TSDI board having two ADC's and two multiplexers.

Referring now to FIG. 9A, a Time Share Digital Integrator (TSDI) detector array board 95 according to the present invention may be seen to include a plurality of pre-conditioner circuits (PC's) 102, one for each detector element 96 on the board. An output terminal of each detector element 96 is connected to an input terminal of a separate pre-conditioner circuit 102. The quantity N of detector elements 96 and pre-conditioner circuits 102 may be any suitable number, but is typically a binary number $2^n$, such as 32, 64, 128, 246, etc. Also, the shape, size, spacing, and geometric relationship of detector elements 96 may be any suitable values. For example, detector elements 96 may squares 2 mm on a side stacked end-to-end in a column to comprise an array 97.

Detector elements 96 may be of any suitable type for converting X-ray photons into electrical circuits, including blocks of semiconductor material which may contain a P-N junction, or a photo-detector responsive to light photons produced by fluorescence of an adjacent scintillator material in response to irradiation of the scintillator by X-ray photons.

As will be described in further detail below, each pre-conditioner circuit 102 may optionally be an amplifier, an amplifier with associated low-pass filter (a pseudo-integrator), or a true integrator circuit and associated sample and hold circuits, capacitor discharging switches and series coupling switches.

As shown in FIG. 9A, detector array board 95 according to the present invention includes an analog multiplexer 103 which has a plurality of input terminals, one each of which is connected to an output terminal of a separate one of the plurality of pre-conditioner circuits 102. Multiplexer 103 has an output terminal which is connected to an input terminal of a gain/offset compensation circuitry block 104. The function of the gain/offset compensation circuitry block 104 is to amplify or attenuate analog signals output from multiplexer 103 to ensure that signals output from the block to an ADC 105 are within the dynamic range and D.C. offset level requirements of the ADC, despite widely varying detector input signal ranges and offsets resulting from different X-ray source strengths, different scan geometries, and different scan times characteristics of a particular X-ray radiography system in which detector array boards 95 may be used.

Detector array board 95 also includes a TSDI Scan and Transfer Control circuitry block 106. The latter utilizes resident software and/or control signals from a Digital Acquisition Module 107 or external host computer 108 to control timing and sampling of signals output from pre-conditioner circuits 102, selecting detector channel and multiplexer 103, adjusting gain and offset via gain and offset control circuitry block 104, converting analog detector channel signals to digital values by ADC 105, accumulating digital detector signals in memory locations or registers (neither shown), scaling the accumulated values, and outputting the scaled accumulated values on output terminal 109 of the board.

Operation of a basic embodiment of a TSDI (Time Share Digital Integrator) detector array board according to the present invention, such as board 95 shows in FIG. 9A, may be best understood by referring to FIGS. 7, 10, 11 and 12 in addition to FIG. 9A. As shown in FIG. 10, board 95 includes within Scan and Transfer Control Circuitry block 106 a digital control module 110, which includes therein accumulator memory locations 111 for accumulated detector channel output digital signals. Accumulator locations 111 may be memory locations selected by a software pointer, or dedicated, hardware register locations of a Field Programmable Gate Array (FPGA). In any event, there is associated with each detector element 96 an FPGA register or memory location. Operation of basic embodiment 95 of a detector array board according to the present invention is as follows:

1. Initialization: All registers or memory accumulators 111 are cleared.
2. Irradiate individual detector array elements 96 with a fan beam 92 of X-ray radiation transmitted through a vertical slice of an object 57 in object space 93, during a scan-line time corresponding to a time period required for the beam to transversely scan the object slice, or the object to move a distance corresponding to the object slice through the fan beam.
3. Sample output data from each detector a plurality of times P, add and store the digital value of each sample in separate dedicated register or memory accumulator storage locations allocated to each detector channel.
4. After accumulating the Pth detector digital value in an accumulator, optionally scale the accumulated, or digitally integrated value by a predetermined number, e.g., divide the accumulated value by P to obtain a time-averaged value of the detector output signal.
5. Transfer scaled data out from board 95 to a Digital Acquisition Module 107 or host computer 108 for concatenation.
6. Repeat steps 1–5 for each of Q object image slices corresponding to the width of object space 93.
7. Concatenate the Q sequences of digital detector values into a full width electronic raster image of the object field.

Following steps 1–7, two dimensional electronic images of an object field thus formed may be visually displayed on a visual display device such as a CRT or LCD of a television or computer monitor. Importantly, the P successive detector digital signal arrays are digitally added to one another in each of the separate accumulators allocated to the detector channels. Therefore, the time-average signal value accumulated in each accumulator location has a greater signal-to-noise ratio than a single sample of a detector output. Specifically, the noise is reduced by the factor $1/\sqrt{P}$.

To avoid introduction of switching noise into data signal paths of detector array boards 95, it is desirable to separate data transfer from data conversion events. According to the present invention, there are two methods for separating data transfer time from data conversion time, namely Sample-Until-Done and Multi-Scan, which will now be described.

FIG. 11 shows two different techniques for operating a detector array board 95 in a Sample-Until-Done mode. For ease of exploration and understanding, the two techniques of FIG. 11 use an example system which has two DAB's 95, each of which is provided with 4 detector elements 96.

In the Sample-Until-Done technique illustrated in the first two diagrams of FIG. 11, on line 1, data is scaled at the end of each of four detector frames. Line 2 shows the scaled data from the four detectors being transferred out simultaneously from the two boards at the end of each scan line.

The third, staggered split, timing diagram of FIG. 11 shows detector channels of the two boards being scaled consecutively, rather than simultaneously, and data from the two boards transferred out from the boards consecutively, rather than simultaneously.

Figure 12:
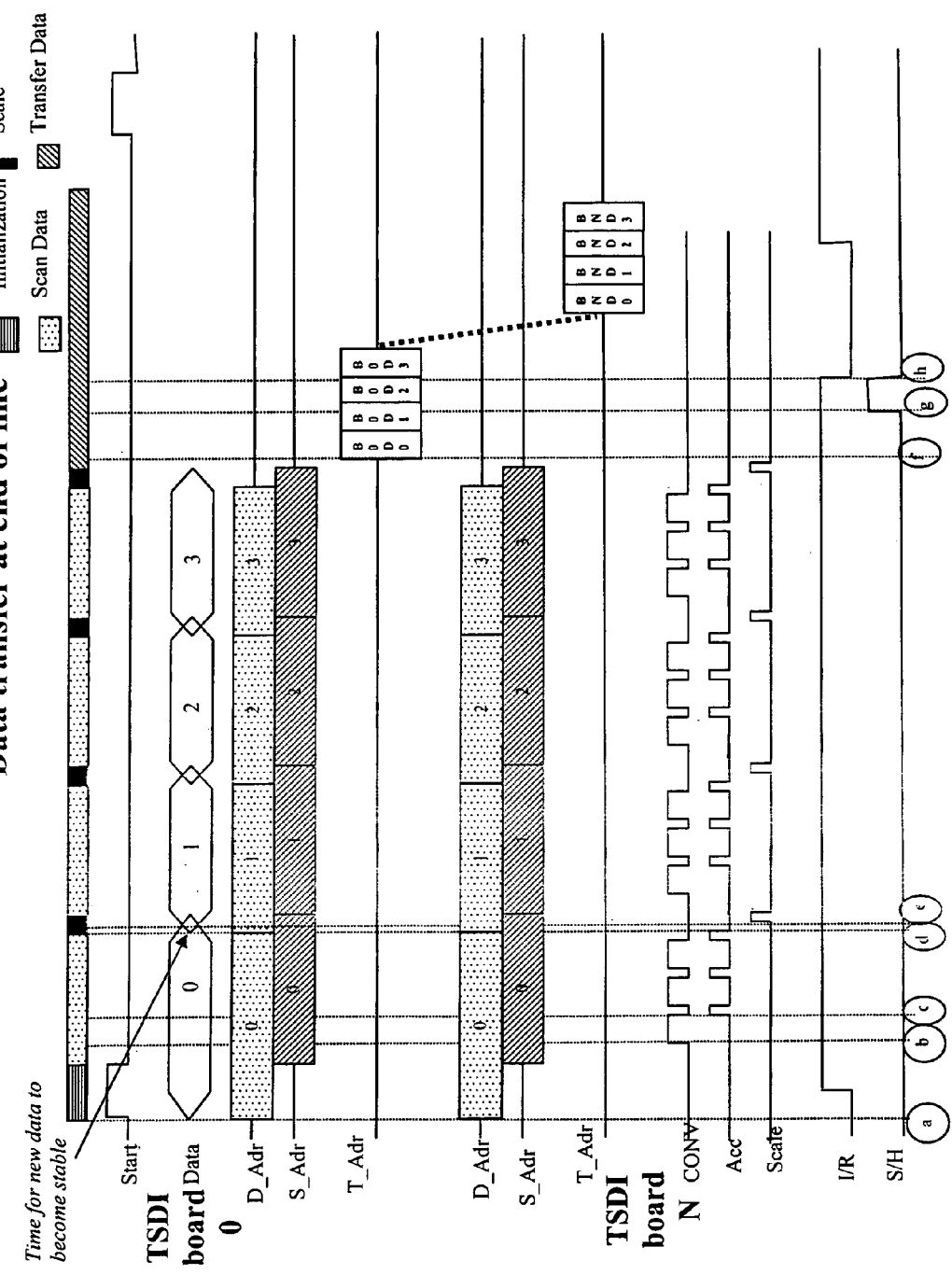
FIG. 12 is a timing diagram showing timing relationships between signal processing events for a system for signal processing X-ray radiography signals of a plurality of TSDI boards of FIG. 9.

FIG. 12 is a more detailed timing diagram showing the time relationships between signal processing events for a plurality of N TSDI DAB boards 95 employing the Straight Split Sample-Until-Done method of operation shown in lines 1 and 2 of FIG. 11. To simplify explanation of this mode, the example of FIG. 12 shows the operation of N boards each having 4 detectors. Practical systems would usually employ boards 95 which were provided with more than 4 detectors. Following is a description of key events of the Straight Split Sample-Until-Done operational mode of a plurality of N TSDI boards 95 according to the present invention.

a. At the beginning of each data or scan line corresponding to a slice of an X-ray shadow image formed on detector array 97 by a slice of an object, the image incident upon a vertical stack of TSDI Detector Array Boards (DAB's) 95, all TSDI based components are initialized. Initialization includes the steps of resetting to zero Detector Address (D_Adr), Store Address (S_Adr), Transfer Addresses (T_Adr) counters, and all registers or memory locations used as accumulator storage sites. All analog detector signal processing circuits are enabled, e.g., by discharging integrator capacitors and sample-and-hold circuits for TSDI boards of the type employing true integrator circuits.

b. After completing initialization, the analog output signal of each detector channel, specified by D_Adr, is sampled by multiplexer 103 and conveyed to the input terminal of ADC 105. According to a preferred operating mode of the invention, sampling of each detector channel analog output signal is performed P times, where P may be as large a number as scanning rates permit, but in the simplified example shown in FIG. 12 is 3.

c. Analog output signals of each detector channel are converted into digital values by ADC 105, and input to a separate location pointed to by S_Adr, if an accumulator 111 (see FIG. 10), which may optionally and alternatively be a hardwired register of a Field Programmable Gate Array (FPGA), or a memory location pointed to by a RAM Control Module 116 of Digital Control Module 110. Steps (b) and (c) are repeated a predetermined number of times P, which in the present simplified example is 3.

d. At the end of sampling period allocated for the P samples of detector channel output signals, an address selection control module 117 of Digital Control Module 110 increments detector channel address D_Adr, e.g., from the address of detector 0 to that of detector 1. A settling time period is provided to wait for the output signal of the newly addressed detector channel to become stable.

e. The time period waiting for new detector data to become stable is desirably utilized to scale to a preferred format data previously stored in the accumulator of a different detector channel. After this optional scaling step, the scaled data is written into a memory location specified by (S_Adr). The storage address is then incremented preparatory to accumulating data from the next detector channel.

f. Digital signals corresponding to accumulated and scaled output signals of each separate detector channel of a board are then transferred out from the board to a Digital Acquisition Module 107 or host computer 108. This step involves using the transfer address T_Adr to specify addresses of accumulator 111 where detector signal data is accumulated. In FIG. 12 B0D0 represents Board_0, Detector_0, and so on. By staggering the beginning of the scan line for each TSDI board 95, as shown in the third timing diagram of FIG. 11, more time is available for data conversion to thereby achieve more noise reduction, because of longer integration time available.

g. During the data transfer time period, analog signals collected by TSDI boards of the type which use true integrators are input to sample-and-hold circuits.

h. After sample-and-hold circuits have captured analog data, integrator capacitors are discharged in preparation for capturing a next scan line of detector data corresponding to a next image slice of an object.

Note that in a system which uses true integrators, while detector data from a current scan line is being sampled, TSDI board 95 converts and transfers data captured from the previous scan line. The effect of over-sampling data of a channel averages the data and reduces the contribution of electronic noise to the detector data. This noise may be significant in systems with low signal levels and which therefore must use high gain values, particularly in secondary gain stages before the ADC. The TSDI board also enables deeper resolution that is typically not achievable by an ADC, since inherently, an ADC has its own noise level. For example, a typical 16-bit ADC will exhibit approximately 2 bits of noise. In principle, if electronic noise is white noise, the theoretical noise reduction factor achievable by averaging a large number of samples is 1/sqrt(Number_Sample). Thus, averaging 9 samples of the signal achieves a noise reduction factor of 1/3.

Example: A system with
1. Scan rate of 200 lines per second→One line takes 5 ms.
2. 1024 detectors→Allocate transfer time for each detector 200 ns. Total time for data transfer=1025*200 ns=204.8 us. Time remain for conversion: 5000−204.8=4795.2 us.
3. Detector board contains 64 detectors.
4. Allocate 1 us for Multiplexed data delay. Address must be switched 64 times, once for each detector. Time remaining for conversion=4731.2/64=4731.2 us.
5. Time available for each detector=4731.2/64=73.8 us.
6. ADC conversion rate 1 MHz→Number over sampling per detector time=73/1=73 samples.
7. Noise reduction could be up to sqrt(73)=8.5X.

Multi-Scan Operation

In scanning X-ray radiography systems which utilize a relatively large number of individual X-ray radiation detector elements, whether the detectors are arranged in a single array on a single detector array board or in end-to-end arrays of multiple detector array boards, undesirable artifacts can be introduced into electronic images of objects formed by concatenated image data obtained by serially sampling detector signal outputs. The artifact problem, which is described in detail below, may be eliminated by using a separate true integrator circuit and sample-and-hold circuit in each detector signal output channel. However, this solution is relatively costly and complex, requiring at least two operational amplifiers and two analog switches for each detector channel output signal, as opposed to the single operational amplifier required for detector output signal pre-conditioning circuits that employ a pseudo-integrator. Thus, it is desirable to use pseudo-integrator circuits rather than true integrators, to reduce the cost and complexity of detector array signal processing boards. However, if the time constraint of the pseudo-integrator circuits is too long, image details which are contained in contrasts between features of consecutive scan lines will be lost. But, shortening a pseudo-integrator time constant to avoid loss of image contrast features results in an image artifact, as will now be described.

When a shadow image of an object with a straight edge simultaneously traverses multiple detector boards in a vertical array using a sample-until-done operational mode of a detector array board, the image of the object edge can become degraded, for the following reasons. In the following example, certain assumptions are made for the purpose of simplifying a description of the artifact problem. The assumptions are:

1. A shadow image edge feature defined by a light to dark transition appears simultaneously on multiple detector boards.
2. The decay rate of charge on the capacitor of each pseudo-integrator output of each detector channel is uniform.
3. Sampling-Until-Done reading of a first detector of a board in a sequence is done while the pseudo-integrating capacitor voltage of the first detector is at a maximum value.
4. Sampling-Until-Done reading of the last detector of a sequence of detectors is done, at a time when the pseudo-integrator capacitor voltage of the last detector has decayed to a minimum value.
5. A plurality of detector array boards is stacked end-to-end.

Figure 16:
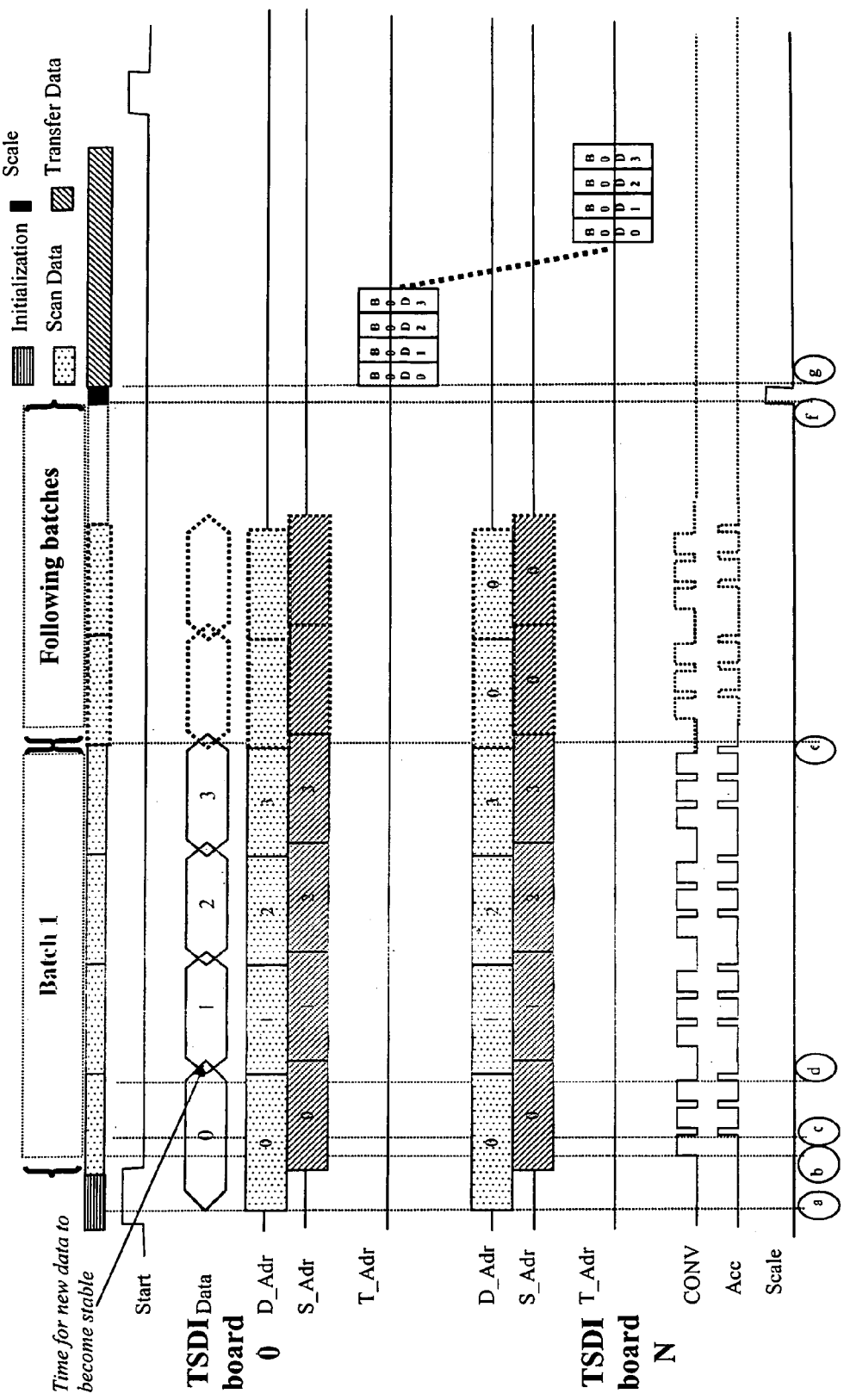
FIG. 16 is a timing diagram showing time relationships between signal processing events for an X-ray radiography signal processing system which utilizes 4 TSDI boards of the type shown in FIG. 9, which is configured to utilize a Multi-Scan operational mode according to the present invention.

Referring now to FIG. 13A, it may be seen that at the edge of an object image incident upon an array of data lines (four detectors are shown in the present simplified example), the capacitor voltage of each pseudo-integrator capacitor of each detector channel decays exponentially. During the time interval shown in FIG. 3, the first detector D0 of an array of 2" detectors of all boards N is sequentially sampled P times simultaneously to effect digital accumulation and time integration to reduce noise, is described above for a basic embodiment of the invention. The next detectors D1 of all of the boards are sampled P times, and the signal outputs of all the second detectors accumulated and therefor digitally time integrated. The output signal of each succeeding detector is sampled in exactly the same way, until the last detector (D3 in the simplified 4-detector example of FIG. 13A) of all the boards has been sampled. Thus, during the time internal shown in FIG. 13, sampling of detector output signals is performed in 4 consecutive batches of the 4 detectors in a line, each batch including P samples of detector channel output signals. Now, as shown in FIG. 13B, detector pseudo-integrator output voltage sampling and digital accumulation and integration are performed for each detector during its particular batch sampling time interval. Thus, by using a Sample-Until-Done operating mode, each succeeding detector channel pseudo-integrator output voltage will have decayed to a substantially lower value. Thus, there will be large differences in accumulated and integrated detector signal values corresponding to sampling occurring at different points of the exponential pseudo-integrator capacitor decay curve shown in FIG. 13B. Therefore, when detector signal data from a series of detector boards which are arranged end-to-end is concatenated to make an electronic image of an elongated image field space, if a vertically disposed image feature edge lies on two or more boards, as shown in FIG. 13C, the concatenated signal data will exhibit a sawtooth, jagged edge artifact. FIG. 13D illustrates a two-dimensional image which has such an artifact. FIGS. 14–16 illustrate a Multi-Scan operational mode of detector array boards 95 according to the present invention, which substantially reduces the sawtooth image artifacts of the type described above.

FIG. 14 illustrates a Multi-Scan operational mode for detector array boards 95 according to the present invention, by which mode sawtooth image artifacts are substantially reduced.

The Multi-Scan technique according to the method of the present invention includes the steps of repetitively sampling analog output signals of a first detector P times to reduce noise as in the basic embodiment of the invention described above, and sequentially sampling each of the ($2^n$−1) remaining detector channel output signals of a board. According to the basic method of the present invention, each of the $2^n$ detectors in a line of a boards is sampled in parallel in the same manner, so that at the end of a long detector array, a relatively long delay time between sampling the first detector on each board and the last detector of each board allows the voltage stored on the last pseudo-integrator capacitor to decay to a substantially smaller value than was sampled from the first detector of each board. This results in an artifact manifested by a jagged image line.

The Multi-Scan method of the present invention substantially reduces the magnitude of the above-described artifact by sampling simultaneously each detector in a plurality of N detector array boards P times and sequentially digitally accumulating the sum of the P samples of each of the sequence of $2^n$ detector channels of the boards, for the first batch of a sequence of Q batches. The detector output signals of each board in a series of boards is then sampled in the same manner in a second batch scan. After the last batch-scan of a stack of boards has been scanned in batch Q, the time-average digital signal accumulated in each detector channel accumulator is time averaged not only relative to P times the sampling time for P consecutive samples of each sampling sequence, but also over the larger batch scanning period Q. Therefore, when values stored in the digital accumulator for each detector channel are read-out and scaled, variations in outputs from the first detector and the last detector output channels which result from widely separated sampling times are greatly reduced, since sampling of all detector channels is distributed throughout the capacitor-voltage decay time curve.

A simplified example of the Multi-Scan operational mode described above is shown in FIG. 14. In this simplified example, an imaging X-ray radiography system has 2 detector array boards (DAB's) 95, each having four detectors provided with pseudo-integrators having a time constant which is sufficiently short to ensure that object features having sufficiently high spatial frequencies are discernible at the scanning frequency used. As shown in FIG. 14, the output signal of first detector, D0 of first boards B0 and second board B1 are simultaneously and sequentially sampled P times. The analog detector output signals of detectors D1 on boards B0 and B1 . . . . BN are then simultaneously sampled in parallel P times and converted to digital values which are digitally accumulated. This sequence of repetitive sampling detector output signals on each of a plurality of N boards is continued until the last detector, D3, in the present simplified example, of each board has been sampled P times. Completion of the Pth sampling of the $2^n$th detector of each of a plurality of N boards completes a first sampling "batch," shown in FIG. 14. Simultaneous multiple sampling P times of each detector DN of a plurality of R boards is performed in the same manner as described above for a second batch, until a desired number of batches (3 in FIG. 14) has been completed.

FIG. 15 illustrates how the novel batch scanning technique of the Multi-Scan method according to the present invention decreases imaging artifacts of the type shown in FIG. 13. Comparing FIG. 15A with FIG. 13A, it may be seen that, during the exponential decay of the voltages of a plurality of pseudo-integrator capacitors for a column array of 4 detectors irradiated by a vertical edge of a shadow image, the output voltage of each of the four detectors is sampled in a sequence of Q=5 Batches. During each of the Q consecutive batches, output signals of all of the detectors on all of the boards are digitally accumulated. Thus, each detector of each board accumulator receives P samples during 5 consecutive batch scans, each at a latter part of the exponential decay curve shown in FIG. 15A.

Referring to FIG. 15B, since each detector accumulator captures-data at all parts of the input signal decay curve, differences between the highest and lowest decay curve signal levels are reduced. Accordingly, as shown in FIG. 15B, the discontinuity in digital image output signals between pairs of end-to-end boards, e.g., board N and board N+1 is substantially reduced from the discontinuity occurring in the Sample-Until-Done operational mode without Multi-Scan, as shown in FIG. 13C.

FIG. 16 is a more detailed timing diagram showing time relationships for a Multi-Scan operational mode of a simplified example of the present invention, which uses four TSDI DAB boards 95, each having four detectors. Key timing events of a Multi-Scan operational mode with data transfer at the end of each scan line are identified by letters (a) through (g), and described below by paragraphs having those same designation letters.

a. At the beginning of each data or scan line corresponding to a slice of an X-ray shadow image formed on detector array 97 by a slice of an object, the image incident upon a vertical stack of TSDI Detector Array Boards (DAB's) 95, all TSDI based components are initialized. Initialization includes the steps of resetting to zero Detector Address (D_Adr), Store Address (S_Adr), Transfer Addresses (T_Adr) counters, and all registers or memory locations used as accumulator storage sites. All analog detector signal processing circuits are enabled.

b. After completing initialization, the analog output signal of each detector channel, specified by D_Adr, is sampled by multiplexer 103 and conveyed to the input terminal of ADC 105. According to a preferred operating mode of the invention, sampling of each detector channel analog output signal is performed P times, where P may be as large a number as scanning rates permit, but in the simplified example shown in FIG. 16 is 3.

c. Analog output signals of each detector channel are converted into digital values by ADC 105, and input to a separate location pointed to by S_Adr, of an accumulator 111 (see FIG. 10A), which may optionally and alternatively be a hardwired register of a Field Programmable Gate Array (FPGA, or a memory location pointed to by a RAM Control Module 116 of Digital Control Module 110. Steps (b) and (c) are repeated a predetermined number of times P, which in the present simplified example is 3.

d. At the end of sampling period allocated for the P samples of detector channel output signals, an address selection control module 117 of Digital Control Module 110 increments detector channel address D_Adr, e.g., from the address of detector 0 to that of detector 1. A settling time period is provided to wait for the output signal of the newly addressed detector channel to become stable.

e. After the last detector output channel signals of all boards have been simultaneously sampled P times, (the fourth detector of each of four boards sampled 3 times in the present simplified example) a first sampling batch has been completed.

f. After completion of the first batch of a predetermined number of batches has been completed, batch scan sequence steps (b) through (e) are repeated Q−1 times.

g. After completion of the last batch scan, Q, of a sequence of Q batch scans, accumulated detector output signal data is scaled into a preferred format.

h. Before the beginning of a next scan line for processing a new image slice, accumulated and scaled digital data corresponding to detector output signal values is transferred from TSDI boards 95 to Digital Acquisition Module (DAM) 107, or a host computer 108, using T_Adr. In the diagram of FIG. 16 B0D0 represents Board_0, Detector_0, etc.

In the Multi-Scan operational mode described above, in which data is transferred from each TSDI board 95 at the end of a scan line, the steps of sampling detector output signals, conversion of the output signals to digital values, accumulation of the digital values in a register or memory storage location, scaling of the values and sequential transfer of the scaled values from a detector array board for concatenation to form an electronic image raster, are all performed in the same time frame allocated to scan a line. This method saves register or storage space, but wastes time in waiting for detector data to settle, data scaling and data transfers. However, as described above, it is desirable to repeat the multiple scanning batches of all detectors of a detector board multiple times. The larger number of times this multiple batch scanning is repeated, the less will the magnitude of the artifact caused by end-to-end detector data mismatching resulting from decay of charge in the pseudo-integrator capacitors. Also, time is wasted in waiting for data to be stable each time the address of a detector channel is switched, to enable processing signals from the next detector channel in a sequence. For example, if the required waiting time for a signal to settle or stabilize on a switched signal line is one microsecond, a detector array board with 64 channels will lose 64 microseconds of processing time every iteration through the detector array.

Further reduction in time available for sampling detector data results from the time required to cycle through-memory locations to access data. Also, if scaling accumulated digital detector data signals involves multiplying or dividing an accumulated value by an arbitrary number, processing time can be significant. Reduction of data access time can be effected by providing registers for data storage, rather than memory locations.

Digital values representing image information obtained from each detector must ultimately be output from a detector array board to a host computer, either directly or into a digital acquisition module, where data from multiple image slices of an object obtained on one or more detector array boards is concatenated to form a complete electronic raster image of the object. The electronic image is used by the host computer or other external equipment to produce a visual image and/or be processed by pattern recognition software to detect guns, explosives, etc. Since a typical system according to the present invention has a thousand or more detectors, the time required for outputting image data can become significant. Although various high speed data transfer techniques such as LVDS (Low Voltage Differential Signal) are available, implementing such techniques on each detector array board can significantly increase the cost of the board because of increased component count. Preferably, therefore, in accordance with one aspect of the present invention, detector array board data transfer rates are increased by the following method.

An increase in the data transfer rate of detector array boards according to the present invention utilizes two-memory storage banks or blocks which have functions that are cyclically interchanged, or "ping-ponged." A first of the two memory banks, referred to as "bank zero" for example is used during a first time interval to accept scaled detector scan data. During this first time interval, a second memory bank, referred to as "bank one" is configured to transfer previously stored detector array data off of the detector array board. This configuration is accomplished by digital switches. At the end of the first time interval, bank zero, which now contains a full line of detector values, is re-configured from a Scan-Data-Receive configuration to a Data-Transfer-From-Board configuration. This reconfiguration is accomplished by digital switches. At the end of the first time interval, a second time interval starts in which data stored in bank zero is transferred off the board. During this second time interval, a second line of detector data is stored in bank one. At the end of the second time interval, the configuration of banks zero is switched back to a Scan Data Receive configuration, and bank one is simultaneously reconfigured to a Data Transfer configuration. The re-configuration of memory banks zero and one is performed in response to switching signals from the scan and transfer control circuitry block, on a cyclical basis. In this mechanization, input of one line of data occurs during the same time interval that data from a previous scan line is being transferred out from the board. Thus, the data throughput interval of a board is decreased from the sum of the time interval ts required for scanning a line of data into memory and the time interval tt required to transfer a line of data out from the board, to the longest of those two intervals. Thus, this ping-pong mechanization increases the detector array data throughput rate from $1 \div (t_s + t_t)$ to $1 \div$(the largest of $t_s$ or $t_t$).

By adding memory storage to enable "folding over," or simultaneously performing certain data transfer functions while detector output signals are being sampled or scanned, wasted waiting times can be minimized. By this folding process, data throughput rates can therefore be increased at little or no cost, because FPGA's typically have a substantially large on-chip memory space which would not otherwise be fully utilized in the operation of the present invention.

Figure 18:
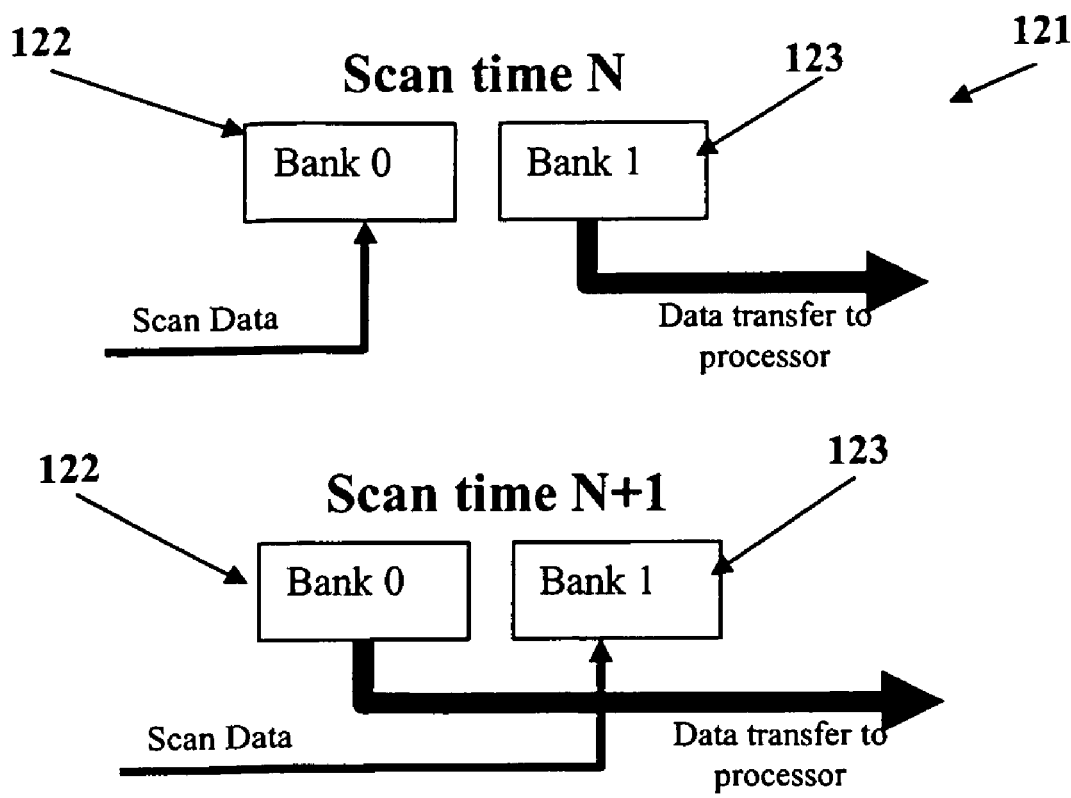
FIG. 18 is a partial block diagram of a modification of the TSDI board shown in FIG. 10, which utilizes a Multi-Scan mode in which Data Transfer is folded into Scan Data time.

FIG. 18 illustrates implementation of a Multi-Scan mode in which data output transfer and data input scanning periods of a TSDI board 95 are partially simultaneously performed, or "folded" into one another. As shown in FIG. 18, a memory module 121, which may be part of a FPGA, is structured into two independent memory blocks, identified as Bank 0 (122) and Bank 1 (123). During a given scan line, each memory block will have only one primary function, namely, scanning or sampling input data, or transferring data out from board. The function of blocks 122, 123 are always different from one another, and are interchanged or "ping-ponged" at the beginning of each new scan line time period. While one memory bank, e.g., bank 1 (123) is holding data from a previous scan line preparatory to transferring the data from a TSDI board 95, settling time can be allowed for scanning data from a new scan line followed by accumulating and scaling of the new data.

Figure 19:
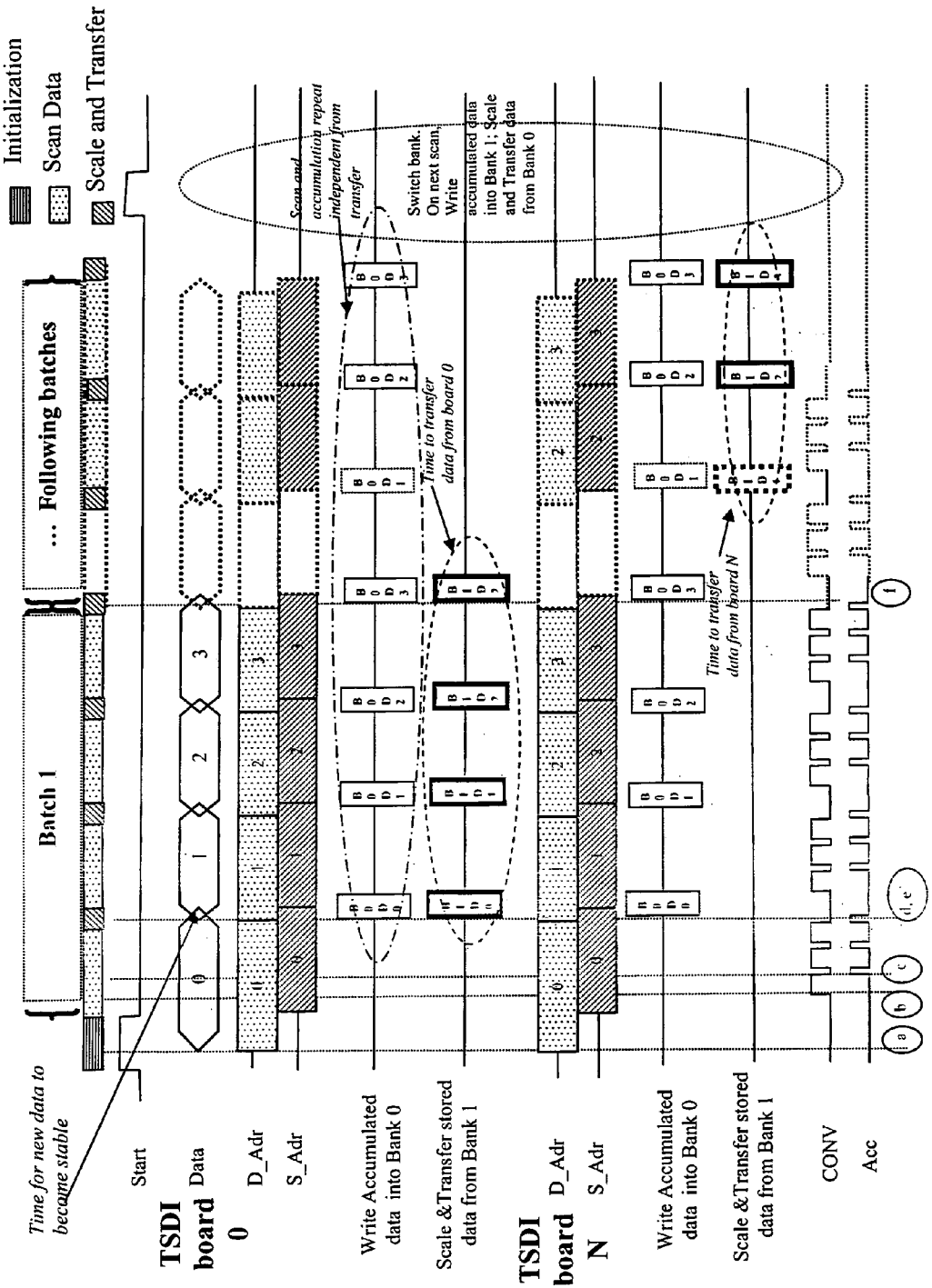
FIG. 19 is a timing diagram of the modified board of FIG. 18.

FIG. 19 is a timing diagram showing time relationships between signal processing events for a Multi-Scan, Data Transfer Fold operational mode for a modification of TSDI board 95 which is provided with dual memory banks 122, 123. The simplified example of FIG. 19 utilizes 4 boards, each having 4 detectors. Operation of the Multi-Scan, Data Transfer Fold mode shown in FIG. 19 as follows:

a. At the beginning of each data or scan line corresponding to a slice of an X-ray shadow image formed on detector array 97 by a slice of an object, the image incident upon a vertical stack of TSDI Detector Array Boards (DAB's) 95, all TSDI based components are initialized. Initialization includes the steps of resetting to zero Detector Address (D_Adr), Store Address (S_Adr), Transfer Addresses (T_Adr) counters, and all registers or memory locations used as accumulator storage sites. All analog detector signal processing circuits are enabled, e.g., by discharging integrator capacitors and sample-and-hold circuits for TSDI boards of the type employing true integrator circuits.

b. Either memory Bank 0 (122) or Bank 1 (123) is selected, e.g., Bank 0, is selected to operate in a Scan Data Mode, i.e., to receive sampled and accumulated digital detector output signals, while the other memory bank, e.g., Bank 1 is selected to operate in a Data Output Transfer Mode.

C. After completing initialization, the analog output signal of each detector channel, specified by D_Adr, is sampled by multiplexer 103 and conveyed to the input terminal of ADC 105. According to a preferred operating mode of the invention, sampling of each detector channel analog output signal is performed P times, where P may be as large a number as scanning rates permit, but in the simplified example shown in FIG. 12 is 3.

d. Analog output signals of each detector channel are converted into digital values by ADC 105, and input to a separate location pointed to by S_Adr, of a Memory Bank 0 (122) of a Field Programmable Gate Array (FPGA). Steps (b) and (c) are repeated a predetermined number of times P, which in the present simplified example is 3.

e. At the end of sampling period allocated for the P samples of detector channel output signals, an address selection control module 117 of Digital Control Module 110 increments detector channel address D_Adr, e.g., from the address of detector 0 to that of detector 1. A settling time period is provided to wait for the output signal of the newly addressed detector channel to become stable.

f. After the last detector output channel signals of all boards have been simultaneously sampled P times, (the fourth detector of each of four boards sampled 3 times in the present simplified example) a first sampling batch has been completed.

g. After completion of the first batch of a predetermined number of batches has been completed, batch scan sequence steps (b) through (f) are repeated Q−1 times.

h. After completion of the last batch scan, Q, of a sequence of Q batch scans, accumulated detector output signal data is scaled into a preferred format.

I. The functional modes of memory Bank 0 (122) and memory Bank 1 (123) are interchanged by digital switches, thereby configuring Bank 0 to operate in a Data Output Transfer mode and Bank 1 to operate in a Scan Data Mode.

J. Accumulated and scaled digital data corresponding to detector output signal values of a first scan line are transferred from memory Bank 0 (122) of TSDI board 95 to Digital Acquisition Module (DAM) (107), or a host computer 108, using T_Adr. During the time period in which data is being transferred from memory Bank 0, new data from a second image slice scan line is scanned into memory Bank 1, using steps (e) through (j). Steps (a) through (j) are repeated a total of Z times for Z image slices.

It should be noted that in the Multi-Scan Data Transfer Fold operational mode described above, it is not necessary for the transfer address to match with the Detector Address or Store Address. Also, in the aforementioned operating mode, there is a one-to-one relation between Detector Address and Store Address of each memory bank, but these addresses do not have to be the same. For example, Detector Addresses may be decremented while Store addresses are incremented, and vice versa.

Since data must be transferred to DAM 107 or host computer 108, from all detectors, it is convenient to use this as output time interval for channel address change and data transfer.

Assuming at least one sample conversion occurs before switching addresses, in a system with 1024 detectors, each TSDI board containing 64 detectors, over-sampling of each detector a minimum amount of 1024/64=16 times, is possible. Thus, the possible noise reduction is ¼.

When the ADC conversion rate is high, the number of integrations could be much higher.

Example: A system with:

1. Scan rate of 200 lines per second→One line takes 5 ms.
2. 1024 detector→Time available for each detector=5 ms/1024=4.883 us.
3. Allocate 1 us for Multiplexed data delay and Data transfer→time for conversion and accumulation=4.883−1=3.883 us.
4. ADC conversion rate 1 MHz→Number over sampling per detector time=3.883/1=3 samples.
5. Detector board contains 64 detector→Number of repeat scan batch in one line=1024/64=16. Each batch allows over sampling a detector of 3 times. Total over sampling is 16*3=48 times. Noise reduction could be up to 6.9× better than systems without TSDI.

Multi-Scan Mode Using Pseudo-integrator

Beside the benefit of lower electronics noise through digital integration, the Multi-Scan also allows systems according to the present invention to improve image sharpness by using Pseudo-Integrators having a shorter time constant. In traditional systems where there is only one sample read from a detector in a line, the time constant for the Pseudo-Integrator is determined by the time for one scan line. Since the sampling period of one detector now is faster, the time constant for the pseudo-integrators can be shorter. Its constraint now is the interval for ADC to read the same detector again after D_Adr change. In a sample system of 1024/64, since the same detector is sampled 16 times, the time constant can be reduced by 1/16. This in effect allows the system to have faster scan rates and sharper images.

Multi-Scan Mode Using True Analog Integrators

Typically, after changing detector address, time must be allowed to wait for new data to be stable before beginning the conversion and accumulation process. Using Multi-Scan in systems with true integrators reduces the time available for digital integration.

Therefore, in typical systems where analog integrators can hold the data for the entire period of one scan line, using Multi-Scan reduces the effectiveness of noise reduction.

Figure 17:
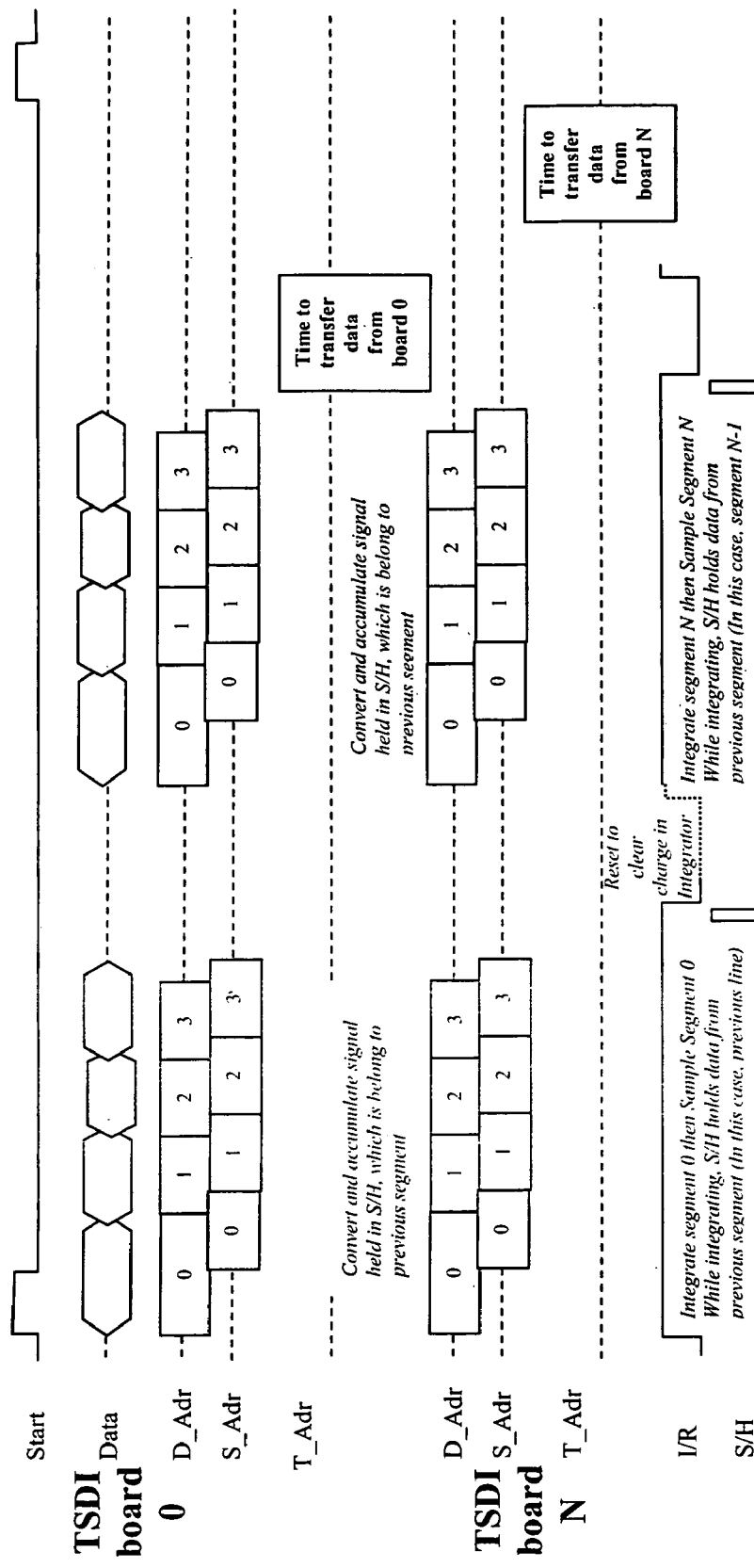
FIG. 17 is a timing diagram of a Multi-Scan method using modified boards of the type shown in FIG. 9, in which pseudo-integrators are replaced by true integrators.

In systems where analog integrators will become saturated either by large signal strengths or long integration times, a variation of the Multi-Scan mode can be used to extend dynamic range without integrator saturation. In this operational mode, shown in FIG. 17, scanning of integrator sample-and-hold values and discharging of integrator capacitors is performed multiple times, i.e., in multiple segments, during the period of a single scan line, as follows.

1. The TSDI controller is programmed to sequentially activate the integrators in shorter time intervals than that of a scan line, in values of 1/N. Each of these intervals is called a segment. The time for these segments must be short enough to prevent saturation of the integrator capacitors.

2. TSDI then integrates one segment while converting/accumulating the other, using each segment as a virtual scan line.

3. Transfer data at the end of scan line.

With current FPGA's it is easy to construct 32-bit or even larger accumulators. Assuming that data from ADC is 16 bits, with a 32 bit accumulator, it is possible to accumulate approximately 65000 times before the digital integrators saturate. At a sampling rate of 1 MHz, in a TSDI board with 64 detectors, the integration time can be as long as 4.16 seconds. Lower sampling rates or increased sizes of accumulators can extend the integration time beyond this example.

What is claimed is:

1. A signal processing method for processing signals output from an array of N X-ray radiation detectors arranged to receive X-ray radiation emanating from an object irradiated by a source beam of X-ray radiation from an X-ray radiation source incident upon an object, said method comprising the steps of;
   a. repetitively sampling P times a detector channel output voltage indicative of X-ray radiation incident upon each of N detectors of an array of detectors, where P is an integer,
   b. accumulating a value proportional to a sum of said P samples of each said output voltage in a separate one of N accumulators, where N is an integer, and
   c. outputting from each of said N accumulators an output signal having a value proportional to said accumulated value,
   d. concatenating said output signals to form a column array of said output signals each of which has a value proportional to X-ray radiation incident upon a corresponding individual detector of said array of detectors, said column array of values being indicative of an image slice of said object incident upon said detector array,
   e. causing relative scanning motion between said object and said X-ray radiation source, in a direction transverse to a direction which said detectors are arranged, said detector array outputting a sequence of signal values corresponding to image slices of an object formed on said detector array, said sequence of image slices corresponding to side-by-side image slices of said object, said sequence of output image slices being formed during a scan line time period approximating that of a time period equal to a width of said detectors-divided by a velocity of said scanning motion,
   f. sequentially arranging side-by-side a plurality of column arrays of signal values to form a two-dimensional array of signal values which is indicative of a two-dimensional view of adjacent image slices of said object, and
   g. wherein said step of outputting from said N accumulators an output signals having values proportional to accumulated signal values indicative of a first in a sequence of object image slices is performed at least partially simultaneously with said step of sampling detector channel output voltages corresponding to a different object image slice.

2. The method of claim 1 wherein accumulators outputting said accumulated signal values of a first object image slice comprise a first, Data Transfer memory storage block and accumulators accumulating data from a successive image slice comprise a second, Scan Data memory storage bank.

3. The method of claim 2 wherein functions of said first and second memory banks are re-configured to said functions of said second and first memory banks, respectively, at the end of each scan-line time period.

4. The method of claim 1 wherein said step of repetitively sampling P times of each of said N detector channel output voltages is done sequentially in a time sequence of N sampling periods corresponding to an ordered arrangement of said N detectors of said array.

5. The method of claim 4 wherein said time sequence of repetitively sampling P times of each of said N detector channel output voltages of each of said detectors in an array is repeated Q times during a scan line time period approximating that of dwell time of an X-ray image slice on said detector array.

6. The method of claim 5 wherein said step of outputting signals from said N accumulators, said signal values from said N accumulators being indicative of a first in a sequence of object image slices, is further defined as being at least partly simultaneous with said step of sampling detector channel output voltages indicative of a successive object image slice of said sequence of image slices.

7. The method of claim 6 wherein accumulators outputting said accumulated signal values of a first object image slice comprise a first, Data Transfer memory storage block and accumulators accumulating data from a successive image slice comprise a second, Scan Data memory storage bank.

8. The method of claim 7 wherein functions of said first and second memory banks are re-configured to said functions of second and first memory banks, respectively, at the end of each scan-line time period.

9. The method of claim 1 wherein each said detector channel output voltage is proportional to charge stored on a separate integrator capacitor, said charge being indicative of intensity and duration of X-ray irradiation of said detector.

10. The method of claim 9 wherein said integrator capacitor of a detector channel is discharged during said step of sampling P times of a next detector channel in a sequence.

11. The method of claim 10 wherein each of said integrator capacitors is discharged, re-charged in response to X-ray irradiation of said detectors, and repetitively sampled P times, a total of R segment times during a single scan-line time period.

12. The method of claim 11 wherein said step of outputting signals from said N accumulators, said signal values from said N accumulators being indicative of a first in a sequence of object image slices, is further defined as being at least partly simultaneous with said step of sampling detector output voltages indicative of a successive object image slice of said sequence of image slices.

13. The method of claim 12 wherein accumulators outputting said accumulated signal values of a first object image slice comprise a first, Data Transfer memory storage block and accumulators accumulating data from a successive image slice comprise a second, Scan Data memory storage bank.

14. The method of claim 13 wherein functions of first and second memory banks are re-configured to said functions of second and first memory banks, respectively, at the end of each scan-line time period.

15. The method of claim 1 wherein said N detectors are located on a first circuit board.

16. The method of claim 15 further including at least a second circuit board on which are located N detectors.

17. The method of claim 16 wherein said sampling of detector output channel voltages of corresponding nth detectors on said first and second boards is performed simultaneously, where n is an integer having a value between 1 and N.

18. An apparatus for processing signals output from an array of N X-ray radiation detectors arranged to receive X-ray radiation emanating from an object irradiated by at least one source beam of X-ray radiation, said apparatus comprising;
 a. a plurality of N pre-conditioner circuits each having an input terminal connected to an output terminal of a separate one of said N X-ray radiation detectors, and each having a separate output terminal,
 b. at least a first analog-to-digital converter circuit module having an input terminal connectable to an output terminal of a selected one of said pre-conditioner circuits for converting an electrical signal output from a said selected one of said pre-conditioner circuits to a digital signal at an output terminal of said analog-to-digital converter indicative of intensity of X-ray radiation incident upon said X-ray radiation detector connected to said pre-conditioner circuit,
 c. a plurality of N digital accumulators, each of which has an input port connectable to said output terminal of said analog-to-digital converter, and
 d. a scan and transfer control circuitry module which performs functions of:
  I. connecting an output terminal of a first selected one of N detector channels comprising a particular detector and associated pre-conditioner circuit to said input terminal of said analog-to-digital convertor,
  ii. repetitively sampling P times a digital signal value output from said analog-to-digital converter indicative of X-ray radiation incident upon said detector of said detector channel,
  iii. accumulating a sum of said P digital values in a first one of said N accumulators,
  iv. connecting an output terminal of a next one of said N detector channels to said analog-to-digital converter and repeating step (I), (ii) and (iii) to accumulate a sum of P digital signal values in said next one of said N accumulators,
  v. repeating steps (I), (ii), (iii) and (iv) until P signal values of each of said N detector channels have been accumulated in said N accumulators, and
  vi. outputting from each of said N accumulators an output signal having a value proportional to said accumulated value.

19. The apparatus of claim 18 further including means for concatenating said output signals to form a column array of said output signals each of which has a value proportional to X-ray radiation incident upon a corresponding individual detector of said array of detectors, said column array of values being indicative of an image slice of said object incident upon said detector array.

20. The apparatus of claim 18 further including at least a first multiplexer for connecting under control of said scan and transfer control circuitry module an output terminal of a selected one of said pre-conditioner circuits to an input terminal of said first analog-to-digital converter.

21. The apparatus of claim 20 further including at least a first digital de-multiplexer for routing a digital output signal from said first analog-to-digital converter to a selected one of said N digital accumulators.

22. The apparatus of claim 21 further including a second de-multiplexer to route a digital output signal from said second analog-to-digital converter to a selected one of a sub-group of said N digital accumulators.

23. The apparatus of claim 20 further including a second multiplexer for connecting under control of said scan and transfer control circuitry module an output terminal of a selected one of a sub-group of said N pre-conditioner circuits to an input terminal of a second analog-to-digital converter.

24. The apparatus of claim 18 wherein said scan and transfer control circuitry is further defined as being configurable to output signal values indicative of a first in a sequence of object image slices at least partly simultaneously with said function of sampling detector channel output voltages indicative of a successive object image slice of said sequence of image slices.

25. The apparatus of claim 24 wherein accumulators outputting said accumulated signal values of a first object image slice comprise a first, Data Transfer, memory storage block and accumulators accumulating data from a successive image slice comprise a second, Scan Data, memory storage bank.

26. The apparatus of claim 25 wherein functions of said first and second memory banks are re-configured to said functions of said second and first memory banks, respectively, at the end of each scan line time period.

27. The apparatus of claim 18 wherein said function of repetitively sampling P times of each of said N digital signal values output from said analog-to-digital converter is done sequentially in a time sequence corresponding to an ordered arrangement of said N detectors of said array.

28. The apparatus of claim 27 wherein said time sequence of repetitively sampling P times of each of said N detector channel output voltages of each of said detectors in an array is repeated Q times during a scan-line time period approximating that of dwell time of an X-ray image slice on said detector array.

29. The apparatus of claim 28 wherein said function of outputting signals from said N accumulators, said signal values from said N accumulators being indicative of a first in a sequence of object image slices, is further defined as being performed at least partly simultaneously with said function of sampling detector channel output voltages indicative of a successive object image slice of said sequence of image slices.

30. The apparatus of claim 29 wherein accumulators outputting said accumulated signal values of a first object image slice comprise a first, Data Transfer memory storage block and accumulators accumulating data from a successive image slice comprise a second, Scan Data memory storage bank.

31. The apparatus of claim 30 wherein functions of said first and second memory banks are re-configured to said functions of second and first memory banks, respectively, at the end of each scan-line time period.

32. The apparatus of claim 18 wherein each of said N pre-conditioner circuits includes an integrator circuit which has an integrator capacitor that charges up to a voltage indicative of intensity and duration of X-ray irradiation of said detector connected to said pre-conditioner circuit.

33. The apparatus of claim 32 further including a separate shunt switch connected across each said integrator capacitor, said shunt switch having an input control terminal connected to said scan and transfer control circuitry module.

34. The apparatus of claim 33 wherein each of said integrator capacitors is discharged, re-charged in response to X-ray irradiation of said detectors, and repetitively sampled P times, a total of R segment times during a single scan-line time period.

35. The apparatus of claim 34 wherein said function of outputting signals from said N accumulators, said signal values from said N accumulators being indicative of a first in a sequence of object image slices, is further defined as being performed at least partly simultaneously with said function of sampling detector output voltages indicative of a successive object image slice of said sequence of image slices.

36. The apparatus of claim 35 wherein accumulators outputting said accumulated signal values of a first object image slice comprise a first, Data Transfer memory storage block and accumulators accumulating data from a successive image slice comprise a second, Scan Data memory storage bank.

37. The apparatus of claim 36 wherein functions of first and second memory banks are re-configured to said functions of second and first memory banks, respectively, at the end of each scan-line time period.

38. The apparatus of claim 33 further including a plurality of N sample-and-hold circuits, each having an input terminal connected to an output terminal of a separate one of said integrator circuits.

39. The apparatus of claim 18 wherein each of said N pre-conditioner circuits includes a pseudo-integrator circuitry which includes a low-pass filter.

40. The apparatus of claim 18 wherein said N detectors are located on a first circuit board.

41. The apparatus of claim 40 further including at least a second circuit board on which are located N detectors.

42. The apparatus of claim 41 wherein sampling of detector output channel voltages of corresponding detectors on said first and second boards is performed simultaneously.

* * * * *